(12) United States Patent
Quan et al.

(10) Patent No.: US 10,673,572 B2
(45) Date of Patent: Jun. 2, 2020

(54) COMMUNICATION METHOD AND COMMUNICATION DEVICE

(71) Applicant: Huawei Technologies Co., Ltd., Shenzhen (CN)

(72) Inventors: Wei Quan, Beijing (CN); Bingzhao Li, Beijing (CN); Jian Zhang, Beijing (CN); Xun Tang, Beijing (CN); Jinhua Miao, Shenzhen (CN); Xiaodong Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 67 days.

(21) Appl. No.: 15/879,709

(22) Filed: Jan. 25, 2018

(65) Prior Publication Data

US 2018/0152266 A1 May 31, 2018

Related U.S. Application Data

(63) Continuation of application No. PCT/CN2015/085594, filed on Jul. 30, 2015.

(51) Int. Cl.
*H04L 1/00* (2006.01)
*H04L 1/18* (2006.01)
(Continued)

(52) U.S. Cl.
CPC .............. *H04L 1/1812* (2013.01); *H04L 1/04* (2013.01); *H04L 1/08* (2013.01); *H04L 1/1845* (2013.01);
(Continued)

(58) Field of Classification Search
CPC ....... H04L 1/1812; H04L 5/0044; H04L 1/04; H04L 1/1845; H04L 1/08; H04L 1/1864;
(Continued)

(56) References Cited

U.S. PATENT DOCUMENTS 9,461,788 B2 * 10/2016 Morita ................. H04L 1/1887
2005/0063378 A1 3/2005 Kadous
(Continued)

FOREIGN PATENT DOCUMENTS

CN 1875590 A 12/2006
CN 101350708 A 1/2009
(Continued)

*Primary Examiner* — Albert Decady
*Assistant Examiner* — Osman M Alshack
(74) *Attorney, Agent, or Firm* — Leydig, Voit & Mayer, Ltd.

(57) ABSTRACT

A communication device receives a parallel hybrid automatic repeat request (HARQ) communication instruction, where the parallel HARQ communication instruction is used to instruct the communication device to send or receive data in a parallel HARQ manner, where the sending data in a parallel HARQ manner by the communication device is sending, by the communication device, at least one data packet with same content within a transmission time interval; and the receiving data in a parallel HARQ manner by the communication device is receiving at least one data packet with same content within a transmission time interval, and performing combined decoding on the received at least one data packet with same content; and the communication device sends or receives the data in the parallel HARQ manner according to the parallel HARQ communication instruction. According to the present invention, a delay of data transmission can be reduced.

17 Claims, 21 Drawing Sheets

(51) Int. Cl.
*H04L 1/04* (2006.01)
*H04L 1/08* (2006.01)
*H04L 5/00* (2006.01)
*H04W 72/04* (2009.01)

(52) U.S. Cl.
CPC .......... *H04L 1/1864* (2013.01); *H04L 1/1887* (2013.01); *H04L 1/1896* (2013.01); *H04L 5/0044* (2013.01); *H04L 5/0094* (2013.01); *H04W 72/042* (2013.01); *H04W 72/0413* (2013.01); *H04L 1/189* (2013.01); *H04L 1/1822* (2013.01); *H04L 5/001* (2013.01)

(58) Field of Classification Search
CPC ... H04L 5/0094; H04L 1/1887; H04L 1/1896; H04L 5/001; H04L 1/189; H04L 1/1822; H04W 72/042; H04W 72/0413
See application file for complete search history.

(56) References Cited

U.S. PATENT DOCUMENTS

| | | | | |
|---|---|---|---|---|
| 2008/0074999 | A1* | 3/2008 | Usuda | H04L 1/1607 370/229 |
| 2008/0120492 | A1 | 5/2008 | Dye | |
| 2008/0165670 | A1* | 7/2008 | Tao | H04L 5/0053 370/203 |
| 2009/0116434 | A1 | 5/2009 | Lohr et al. | |
| 2009/0254790 | A1* | 10/2009 | Pi | H04L 1/1854 714/749 |
| 2010/0046459 | A1 | 2/2010 | Nishio et al. | |
| 2010/0157791 | A1* | 6/2010 | Casaccia | H04L 1/0045 370/216 |
| 2010/0195629 | A1* | 8/2010 | Chen | H04L 1/1664 370/336 |
| 2010/0260130 | A1* | 10/2010 | Earnshaw | H04L 1/1812 370/329 |
| 2011/0141901 | A1* | 6/2011 | Luo | H04L 1/1822 370/241 |
| 2011/0243000 | A1* | 10/2011 | Nagaraja | H04L 1/0026 370/252 |
| 2011/0300857 | A1* | 12/2011 | Kazmi | H04L 1/0006 455/423 |
| 2012/0069796 | A1 | 3/2012 | Casaccia et al. | |
| 2012/0176983 | A1* | 7/2012 | Iwamura | H04L 1/1893 370/329 |
| 2012/0240000 | A1* | 9/2012 | Venkataraj | H04L 1/1657 714/751 |
| 2012/0331241 | A1* | 12/2012 | Majonen | H04L 1/1822 711/154 |
| 2014/0321418 | A1* | 10/2014 | Rinne | H04L 1/1822 370/329 |

FOREIGN PATENT DOCUMENTS

| | | |
|---|---|---|
| CN | 101426229 A | 5/2009 |
| CN | 102098127 A | 6/2011 |
| CN | 102405664 A | 4/2012 |
| CN | 102594500 A | 7/2012 |
| CN | 103220091 A | 7/2013 |
| CN | 103384177 A | 11/2013 |
| EP | 1816883 A1 | 8/2007 |
| JP | 2008028656 A | 2/2008 |
| JP | 2008515358 A | 5/2008 |
| JP | 2009525644 A | 7/2009 |
| JP | 2010074836 A | 4/2010 |
| JP | 2010268040 A | 11/2010 |
| WO | 2013098594 A1 | 7/2013 |

* cited by examiner

COMMUNICATION METHOD AND COMMUNICATION DEVICE

CROSS-REFERENCE TO RELATED APPLICATIONS

This application is a continuation of International Application No. PCT/CN2015/085594, filed on Jul. 30, 2015, which is hereby incorporated by reference in its entirety.

TECHNICAL FIELD

The present invention relates to the field of communications technologies, and in particular, to a communication method and a communication device.

BACKGROUND

A Long Term Evolution (LTE) communications system aims to provide low-delay and highly-reliable data transmission.

According to a current communication method, multiple retransmissions are usually performed to improve reliability of data transmission between a transmit end and a receive end. For example:

When the receive end fails to decode a data packet, the receive end feeds back a negative acknowledgement to the transmit end; after receiving the negative acknowledgement fed back by the receive end, the transmit end re-sends the data packet that fails to be decoded to the receive end. The foregoing process may be executed for multiple times.

However, although the reliability of data transmission is ensured to some extent in the foregoing multiple-retransmission manner, multiple transmissions inevitably increase a delay of data transmission.

Therefore, according to the current communication method, data transmission cannot be both low-delay and highly-reliable, and it is imperative to provide a low-delay and highly-reliable data transmission method.

SUMMARY

Embodiments of the present invention provide a communication method and a communication device, so as to provide a low-delay and highly-reliable data transmission method.

According to a first aspect, a communication device is provided, including:

a determining unit, configured to determine a parallel hybrid automatic repeat request HARQ communication instruction, where the parallel HARQ communication instruction is used to instruct the communication device to send or receive data in a parallel HARQ manner; and a transceiver unit, configured to send or receive data in the parallel HARQ manner according to the parallel HARQ communication instruction determined by the determining unit; where the sending data in the parallel HARQ manner is sending at least one data packet with same content within a same transmission time interval; and the receiving data in the parallel HARQ manner is receiving at least one data packet with same content within a same transmission time interval, and performing combined decoding on the received at least one data packet with same content.

With reference to the first aspect, in a first implementation, the communication device is a network device or user equipment.

With reference to the first aspect or the first implementation of the first aspect, in a second implementation, the parallel HARQ communication instruction is a HARQ configuration parameter; and the HARQ configuration parameter is a configuration parameter used by the communication device to send or receive data in the parallel HARQ manner.

With reference to the second implementation of the first aspect, in a third implementation, the HARQ configuration parameter includes a parallel HARQ quantity parameter used by the communication device to send or receive data in the parallel HARQ manner; and the parallel HARQ quantity parameter includes a largest quantity of parallel HARQs or a specific quantity of parallel HARQs.

With reference to any one of the first aspect or the first implementation of the first aspect to the second implementation of the first aspect, in a fourth implementation, if the communication device is user equipment, the transceiver unit is further configured to receive at least one piece of downlink control signaling before sending or receiving data in the parallel HARQ manner, where the at least one piece of downlink control signaling includes a physical resource, a modulation and coding scheme, and a parallel HARQ quantity parameter that are used by the user equipment to send or receive the data in the parallel HARQ manner; and the transceiver unit is specifically configured to send or receive data in the parallel HARQ manner in the following way:

sending or receiving data in the parallel HARQ manner based on the physical resource, the modulation and coding scheme, and the parallel HARQ quantity parameter that are indicated in the at least one piece of downlink control signaling.

With reference to the fourth implementation of the first aspect, in a fifth implementation, each of the at least one piece of downlink control signaling includes at least one of all physical resources used by the user equipment to send or receive data in the HARQ manner; and the transceiver unit is specifically configured to send or receive data in the parallel HARQ manner based on the physical resource indicated in the at least one piece of downlink control signaling and in the following way:

sending or receiving data in the parallel HARQ manner based on all physical resources indicated in the at least one piece of downlink control signaling.

With reference to the fourth implementation of the first aspect or the fifth implementation of the first aspect, in a sixth implementation, the communication device further includes:

a combined decoding unit, configured to: when the user equipment receives at least two pieces of downlink control signaling, and all the pieces of downlink control signaling include a same physical resource, perform combined decoding on the at least two pieces of downlink control signaling before the transceiver unit sends or receives data in the parallel HARQ manner based on the at least one piece of downlink control signaling.

With reference to any one of the fourth implementation of the first aspect to the sixth implementation of the first aspect, in a seventh implementation, the transceiver unit is further configured to:

receive a first carrier parameter before the user equipment receives the at least one piece of downlink control signaling, where the first carrier parameter is used to indicate a first carrier used by the user equipment to receive the at least one piece of downlink control signaling; and the transceiver unit is specifically configured to receive the at least one piece of downlink control signaling in the following way:

receiving the at least one piece of downlink control signaling according to the first carrier indicated by the first carrier parameter.

With reference to any one of the first aspect or the first implementation of the first aspect to the seventh implementation of the first aspect, in an eighth implementation, the determining unit is further configured to:

determine a second carrier parameter before the transceiver unit sends or receives data in the parallel HARQ manner, where the second carrier parameter is used to indicate a second carrier used by the communication device to send or receive the data in the parallel HARQ manner; and the transceiver unit is specifically configured to send or receive data in the parallel HARQ manner in the following way:

sending or receiving data in the parallel HARQ manner according to the second carrier indicated by the second carrier parameter.

With reference to the eighth implementation of the first aspect, in a ninth implementation, the communication device further includes a configuration unit, configured to:

when the second carrier includes at least two carriers, configure the at least two subcarriers included in the second carrier as one virtual carrier before the transceiver unit sends or receives the data in the parallel HARQ manner according to the second carrier indicated by the second carrier parameter; and the transceiver unit is specifically configured to send or receive data in the parallel HARQ manner according to the second carrier indicated by the second carrier parameter and in the following way:

sending or receiving data in the parallel HARQ manner on the virtual carrier.

With reference to any one of the first aspect or the first implementation of the first aspect to the ninth implementation of the first aspect, in a tenth implementation, the transceiver unit is further configured to:

before receiving the parallel HARQ communication instruction, send capability information used to represent that the communication device supports sending or receiving data in the parallel HARQ manner.

With reference to the tenth implementation of the first aspect, in an eleventh implementation, the capability information includes a quantity of parallel HARQs used by the communication device to support sending or receiving data in the parallel HARQ manner.

With reference to the eleventh implementation of the first aspect, in a twelfth implementation, the quantity of parallel HARQs used by the communication device to support sending or receiving data in the parallel HARQ manner is a quantity that is of carriers for carrier aggregation and that can be supported by the communication device.

With reference to any one of the first aspect or the first implementation of the first aspect to the twelfth implementation of the first aspect, in a thirteenth implementation, the transceiver unit is further configured to:

after sending or receiving the data in the parallel HARQ manner, send or receive feedback information by using at least one feedback resource, where the feedback resource is an uplink transmission resource determined according to a physical resource used by the downlink control signaling, or a downlink transmission resource determined according to the physical resource used for sending data in the parallel HARQ manner.

According to a second aspect, a network device is provided, including:

a determining unit, configured to determine a parallel hybrid automatic repeat request HARQ communication instruction, where the parallel HARQ communication instruction is used to instruct user equipment to send or receive data in a parallel HARQ manner; and a sending unit, configured to send the parallel HARQ communication instruction to the user equipment; where the sending data in a parallel HARQ manner is sending at least one data packet with same content within a same transmission time interval; and the receiving data in a parallel HARQ manner is receiving at least one data packet with same content within a same transmission time interval, and performing combined decoding on the received at least one data packet with same content.

With reference to the second aspect, in a first implementation, the sending unit is further configured to send data in the parallel HARQ manner, and the network device further includes:

a receiving unit, configured to receive data in the parallel HARQ manner.

With reference to the second aspect or the first implementation of the second aspect, in a second implementation, the parallel HARQ communication instruction is a HARQ configuration parameter; and the HARQ configuration parameter is a configuration parameter used by the user equipment to send or receive the data in the parallel HARQ manner.

With reference to the second implementation of the second aspect, in a third implementation, the HARQ configuration parameter includes a parallel HARQ quantity parameter used by the user equipment to send or receive data in the parallel HARQ manner; and the parallel HARQ quantity parameter includes a largest quantity of parallel HARQs or a specific quantity of parallel HARQs.

With reference to the second aspect, the first implementation of the second aspect, or the second implementation of the second aspect, in a fourth implementation, the network device further includes a configuration unit, configured to configure at least one piece of downlink control signaling, where the at least one piece of downlink control signaling includes a physical resource, a modulation and coding scheme, and a parallel HARQ quantity parameter that are used by the user equipment to send or receive data in the parallel HARQ manner; and the sending unit is further configured to send the at least one piece of downlink control signaling to the user equipment.

With reference to the fourth implementation of the second aspect, in a fifth implementation, each of the at least one piece of downlink control signaling includes at least one of all physical resources used by the user equipment to send or receive data in the HARQ manner.

With reference to the fifth implementation of the second aspect, in a sixth implementation, there are at least two pieces of downlink control signaling, and all the pieces of downlink control signaling include a same physical resource.

With reference to any one of the fourth implementation of the second aspect to the sixth implementation of the second aspect, in a seventh implementation, the configuration unit is further configured to:

configure a first carrier parameter, where the first carrier parameter is used to indicate a first carrier used by the user equipment to receive the at least one piece of downlink control signaling; and the sending unit is further configured to send the first carrier parameter to the user equipment.

With reference to any one of the second aspect or the first implementation of the second aspect to the seventh implementation of the second aspect, in an eighth implementation, the network device includes the configuration unit, configured to:

configure a second carrier parameter, where the second carrier parameter is used to indicate a second carrier used by the user equipment to send or receive the data in the parallel HARQ manner; and the sending unit is further configured to send the second carrier parameter to the user equipment.

With reference to the eighth implementation of the second aspect, in a ninth implementation, the sending unit is further configured to:

send instruction information to the user equipment when the second carrier includes at least two carriers, where the instruction information is used to instruct the user equipment to configure the at least two subcarriers included in the second carrier as one virtual carrier.

With reference to any one of the second aspect or the first implementation of the second aspect to the ninth implementation of the second aspect, in a tenth implementation, the network device includes the receiving unit, and the receiving unit is configured to: before the determining unit determines the parallel hybrid automatic repeat request HARQ communication instruction, receive capability information sent by the user equipment and used to represent that the user equipment supports sending or receiving the data in the parallel HARQ manner.

With reference to any one of the second aspect or the first implementation of the second aspect to the tenth implementation of the second aspect, in an eleventh implementation, the network device includes the receiving unit, and the receiving unit is configured to receive, by using at least one uplink feedback resource, feedback information sent by the user equipment, where the at least one uplink feedback resource is a transmission resource determined according to a physical resource used by the downlink control signaling; and the sending unit is further configured to:

send feedback information to the user equipment by using at least one downlink feedback resource, where the at least one downlink feedback resource is a transmission resource determined according to the physical resource used for sending data in the parallel HARQ manner.

According to a third aspect, a communication method is provided, including:

determining, by a communication device, a parallel hybrid automatic repeat request HARQ communication instruction, where the parallel HARQ communication instruction is used to instruct the communication device to send or receive data in a parallel HARQ manner, where the sending data in a parallel HARQ manner by the communication device is sending, by the communication device, at least one data packet with same content within a same transmission time interval; and the receiving data in a parallel HARQ manner by the communication device is receiving, by the communication device, at least one data packet with same content within a same transmission time interval, and performing combined decoding on the received at least one data packet with same content; and sending or receiving, by the communication device, data in the parallel HARQ manner according to the parallel HARQ communication instruction.

With reference to the third aspect, in a first implementation, the communication device is a network device or user equipment.

With reference to the third aspect or the first implementation of the third aspect, in a second implementation, the parallel HARQ communication instruction is a HARQ configuration parameter; and the HARQ configuration parameter is a configuration parameter used by the communication device to send or receive data in the parallel HARQ manner.

With reference to the second implementation of the third aspect, in a third implementation, the HARQ configuration parameter includes a parallel HARQ quantity parameter used by the communication device to send or receive data in the parallel HARQ manner; and the parallel HARQ quantity parameter includes a largest quantity of parallel HARQs or a specific quantity of parallel HARQs.

With reference to any one of the third aspect or the first implementation of the third aspect to the third implementation of the third aspect, in a fourth implementation, before the sending or receiving, by the communication device, data in the parallel HARQ manner, the method further includes:

if the communication device is user equipment, receiving, by the user equipment, at least one piece of downlink control signaling, where the at least one piece of downlink control signaling includes a physical resource, a modulation and coding scheme, and a parallel HARQ quantity parameter that are used by the user equipment to send or receive the data in the parallel HARQ manner; and the sending or receiving, by the user equipment, the data in the parallel HARQ manner specifically includes:

sending or receiving, by the user equipment, data in the parallel HARQ manner based on the physical resource, the modulation and coding scheme, and the parallel HARQ quantity parameter that are indicated in the at least one piece of downlink control signaling.

With reference to the fourth implementation of the third aspect, in a fifth implementation, each of the at least one piece of downlink control signaling includes at least one of all physical resources used by the user equipment to send or receive data in the HARQ manner; and the sending or receiving, by the user equipment, data in the parallel HARQ manner based on the physical resource indicated in the at least one piece of downlink control signaling includes:

sending or receiving, by the user equipment, data in the parallel HARQ manner based on all physical resources indicated in the at least one piece of downlink control signaling.

With reference to the fourth implementation of the third aspect or the fifth implementation of the third aspect, in a sixth implementation, before the sending or receiving, by the user equipment, data in the parallel HARQ manner based on the at least one piece of downlink control signaling, the method further includes:

if the user equipment receives at least two pieces of downlink control signaling, and all the pieces of downlink control signaling include a same physical resource, performing, by the user equipment, combined decoding on the at least two pieces of downlink control signaling.

With reference to any one of the fourth implementation of the third aspect to the sixth implementation of the third aspect, in a seventh implementation, before the receiving, by the user equipment, at least one piece of downlink control signaling, the method further includes:

receiving, by the user equipment, a first carrier parameter, where the first carrier parameter is used to indicate a first carrier used by the user equipment to receive the at least one piece of downlink control signaling; and the receiving, by the user equipment, at least one piece of downlink control signaling specifically includes:

receiving, by the user equipment, the at least one piece of downlink control signaling according to the first carrier indicated by the first carrier parameter.

With reference to any one of the third aspect or the first implementation of the third aspect to the seventh implementation of the third aspect, in an eighth implementation, before the sending or receiving, by the communication device, data in the parallel HARQ manner, the method further includes:

determining, by the communication device, a second carrier parameter, where the second carrier parameter is used to indicate a second carrier used by the communication device to send or receive the data in the parallel HARQ manner; and the sending or receiving, by the communication device, data in the parallel HARQ manner specifically includes:

sending or receiving, by the communication device, data in the parallel HARQ manner according to the second carrier indicated by the second carrier parameter.

With reference to the eighth implementation of the third aspect, in a ninth implementation, before the sending or receiving, by the communication device, the data in the parallel HARQ manner according to the second carrier indicated by the second carrier parameter, the method further includes:

if the second carrier includes at least two carriers, configuring, by the communication device, the at least two subcarriers included in the second carrier as one virtual carrier; and the sending or receiving, by the communication device, data in the parallel HARQ manner according to the second carrier indicated by the second carrier parameter includes:

sending or receiving, by the communication device, data in the parallel HARQ manner on the virtual carrier.

With reference to any one of the third aspect or the first implementation of the third aspect to the ninth implementation of the third aspect, in a tenth implementation, before the communication device receives the parallel HARQ communication instruction, the method further includes:

sending, by the communication device, capability information used to represent that the communication device supports sending or receiving data in the parallel HARQ manner.

With reference to the tenth implementation of the third aspect, in an eleventh implementation, the capability information includes a quantity of parallel HARQs used by the communication device to support sending or receiving data in the parallel HARQ manner.

With reference to the eleventh implementation of the third aspect, in a twelfth implementation, the quantity of parallel HARQs used by the communication device to support sending or receiving data in the parallel HARQ manner is a quantity that is of carriers for carrier aggregation and that can be supported by the communication device.

With reference to any one of the third aspect or the first implementation of the third aspect to the twelfth implementation of the third aspect, in a thirteenth implementation, after the sending or receiving, by the communication device, the data in the parallel HARQ manner, the method further includes:

sending or receiving, by the communication device, feedback information by using at least one feedback resource, where the feedback resource is an uplink transmission resource determined according to a physical resource used by the downlink control signaling, or a downlink transmission resource determined according to the physical resource used for sending data in the parallel HARQ manner.

According to a fourth aspect, a communication method is provided, including:

determining, by a network device, a parallel hybrid automatic repeat request HARQ communication instruction, where the parallel HARQ communication instruction is used to instruct user equipment to send or receive data in a parallel HARQ manner, where the sending data in a parallel HARQ manner is sending at least one data packet with same content within a same transmission time interval; and the receiving data in a parallel HARQ manner is receiving at least one data packet with same content within a same transmission time interval, and performing combined decoding on the received at least one data packet with same content; and sending, by the network device, the parallel HARQ communication instruction to the user equipment.

With reference to the fourth aspect, in a first implementation, the method further includes:

sending or receiving, by the network device, data in the parallel HARQ manner.

With reference to the fourth aspect or the first implementation of the fourth aspect, in a second implementation, the parallel HARQ communication instruction is a HARQ configuration parameter; and the HARQ configuration parameter is a configuration parameter used by the user equipment to send or receive the data in the parallel HARQ manner.

With reference to the second implementation of the fourth aspect, in a third implementation, the HARQ configuration parameter includes a parallel HARQ quantity parameter used by the user equipment to send or receive data in the parallel HARQ manner; and the parallel HARQ quantity parameter includes a largest quantity of parallel HARQs or a specific quantity of parallel HARQs.

With reference to the fourth aspect, the first implementation of the fourth aspect, or the second implementation of the fourth aspect, in a fourth implementation, the method further includes:

configuring, by the network device, at least one piece of downlink control signaling, where the at least one piece of downlink control signaling includes a physical resource, a modulation and coding scheme, and a parallel HARQ quantity parameter that are used by the user equipment to send or receive data in the parallel HARQ manner; and sending, by the network device, the at least one piece of downlink control signaling to the user equipment.

With reference to the fourth implementation of the fourth aspect, in a fifth implementation, each of the at least one piece of downlink control signaling includes at least one of all physical resources used by the user equipment to send or receive data in the HARQ manner.

With reference to the fifth implementation of the fourth aspect, in a sixth implementation, there are at least two pieces of downlink control signaling, and all the pieces of downlink control signaling include a same physical resource.

With reference to any one of the fourth implementation of the fourth aspect to the sixth implementation of the fourth aspect, in a seventh implementation, the method further includes:

configuring, by the network device, a first carrier parameter, where the first carrier parameter is used to indicate a first carrier used by the user equipment to receive the at least one piece of downlink control signaling; and sending, by the network device, the first carrier parameter to the user equipment.

With reference to any one of the fourth aspect or the first implementation of the fourth aspect to the seventh implementation of the fourth aspect, in an eighth implementation, the method further includes:

configuring, by the network device, a second carrier parameter, where the second carrier parameter is used to indicate a second carrier used by the user equipment to send or receive the data in the parallel HARQ manner; and sending, by the network device, the second carrier parameter to the user equipment.

With reference to the eighth implementation of the fourth aspect, in a ninth implementation, the method further includes:

sending, by the network device, instruction information to the user equipment if the second carrier includes at least two carriers, where the instruction information is used to instruct the user equipment to configure the at least two subcarriers included in the second carrier as one virtual carrier.

With reference to any one of the fourth aspect or the first implementation of the fourth aspect to the ninth implementation of the fourth aspect, in a tenth implementation, before the determining, by the network device, a parallel hybrid automatic repeat request HARQ communication instruction, the method further includes:

receiving, by the network device, capability information sent by the user equipment and used to represent that the user equipment supports sending or receiving the data in the parallel HARQ manner.

With reference to any one of the fourth aspect or the first implementation of the fourth aspect to the tenth implementation of the fourth aspect, in an eleventh implementation, the method further includes:

receiving, by the network device by using at least one uplink feedback resource, feedback information sent by the user equipment, or sending feedback information to the user equipment by using at least one downlink feedback resource, where the at least one uplink feedback resource is a transmission resource determined according to a physical resource used by the downlink control signaling, and the at least one downlink feedback resource is a transmission resource determined according to the physical resource used for sending data in the parallel HARQ manner.

According to the communication method and the communication device provided in the embodiments of the present invention, data is sent or received in the parallel HARQ manner according to the parallel HARQ communication instruction. The at least one data packet with same content is sent or received within a same transmission time, so that the data packet is sent or received in parallel, and a delay can be reduced. In addition, multiple data packets are sent or received within a same transmission time, so that reliability of data transmission is also improved.

DESCRIPTION OF EMBODIMENTS

The following clearly and completely describes technical solutions in embodiments of the present invention with reference to the accompanying drawings The described embodiments are some but not all of the embodiments of the present invention.

A communication method and a communication device provided in the embodiments of the present invention may be applied to communications scenarios, such as an LTE or Long Term Evolution-Advanced (LTE-A) communications system and another communications system. A communications scenario to which the embodiments of the present invention are applied includes at least a network device that can configure and schedule a resource and user equipment (UE) that can use the resource configured by the network device. The network device and the user equipment communicate with each other. The network device in the embodiments of the present invention may be an evolved NodeB (eNB) in an LTE system, or may be a NodeB in a Universal Mobile Telecommunications System (UMTS), or may be another network device that communicates with the user equipment and configures and schedules a resource for the user equipment. This is not limited in the embodiments of the present invention.

In the embodiments of the present invention, the communication device sends or receives data in a parallel hybrid automatic repeat request (HARQ) manner. At least one data packet with same content is sent or received within a same transmission time interval, so that the data packet is sent or received in parallel, and a delay can be reduced. In addition, multiple data packets are sent or received within a same transmission time, so that reliability of data transmission is also improved.

Figure 1A:
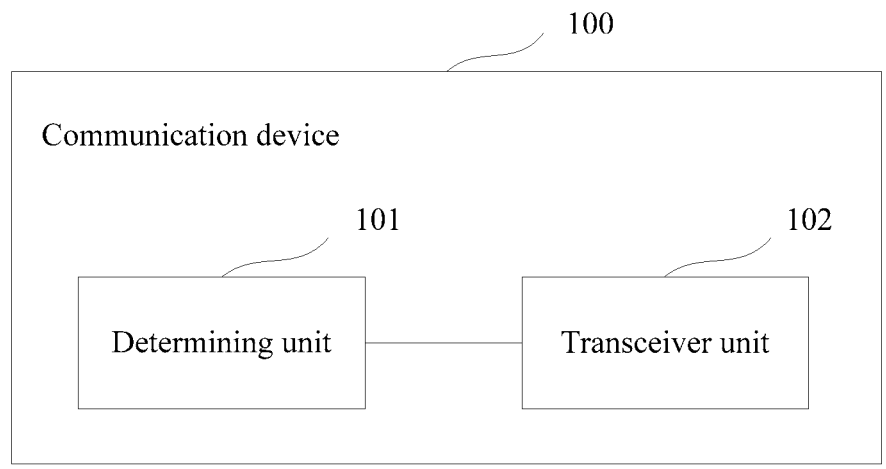
FIG. 1A to FIG. 1C are schematic diagrams of composition of a communication device according to an embodiment of the present invention.

An embodiment of the present invention provides a communication device 100. FIG. 1A shows a schematic diagram of composition of the communication device 100 provided in this embodiment of the present invention. As shown in FIG. 1A, the communication device 100 includes a determining unit 101 and a transceiver unit 102.

The determining unit 101 is configured to determine a parallel hybrid automatic repeat request HARQ communication instruction, where the parallel HARQ communication instruction is used to instruct the communication device 100 to send or receive data in a parallel HARQ manner.

The transceiver unit 102 is configured to send or receive data in the parallel HARQ manner according to the parallel HARQ communication instruction determined by the determining unit 101.

The sending data in the parallel HARQ manner is sending at least one data packet with same content within a same transmission time interval; and the receiving data in the parallel HARQ manner is receiving at least one data packet with same content within a same transmission time interval, and performing combined decoding on the received at least one data packet with same content.

In a first implementation, the communication device 100 is a network device or user equipment.

In a second implementation, the parallel HARQ communication instruction is a HARQ configuration parameter.

The HARQ configuration parameter is a configuration parameter used by the communication device 100 to send or receive data in the parallel HARQ manner.

In a third implementation, the HARQ configuration parameter includes a parallel HARQ quantity parameter used by the communication device 100 to send or receive data in the parallel HARQ manner.

The parallel HARQ quantity parameter includes a largest quantity of parallel HARQs or a specific quantity of parallel HARQs.

In a fourth implementation, if the communication device 100 is user equipment, the transceiver unit 102 is further configured to receive at least one piece of downlink control signaling before sending or receiving data in the parallel HARQ manner, where the at least one piece of downlink control signaling includes a physical resource, a modulation and coding scheme, and a parallel HARQ quantity parameter that are used by the user equipment to send or receive the data in the parallel HARQ manner.

The transceiver unit 102 is specifically configured to send or receive data in the parallel HARQ manner in the following way:

sending or receiving data in the parallel HARQ manner based on the physical resource, the modulation and coding scheme, and the parallel HARQ quantity parameter that are indicated in the at least one piece of downlink control signaling.

In a fifth implementation, each of the at least one piece of downlink control signaling includes at least one of all physical resources used by the user equipment to send or receive data in the HARQ manner.

The transceiver unit 102 is specifically configured to send or receive data in the parallel HARQ manner based on the physical resource indicated in the at least one piece of downlink control signaling and in the following way:

sending or receiving data in the parallel HARQ manner based on all physical resources indicated in the at least one piece of downlink control signaling.

Figure 1B:
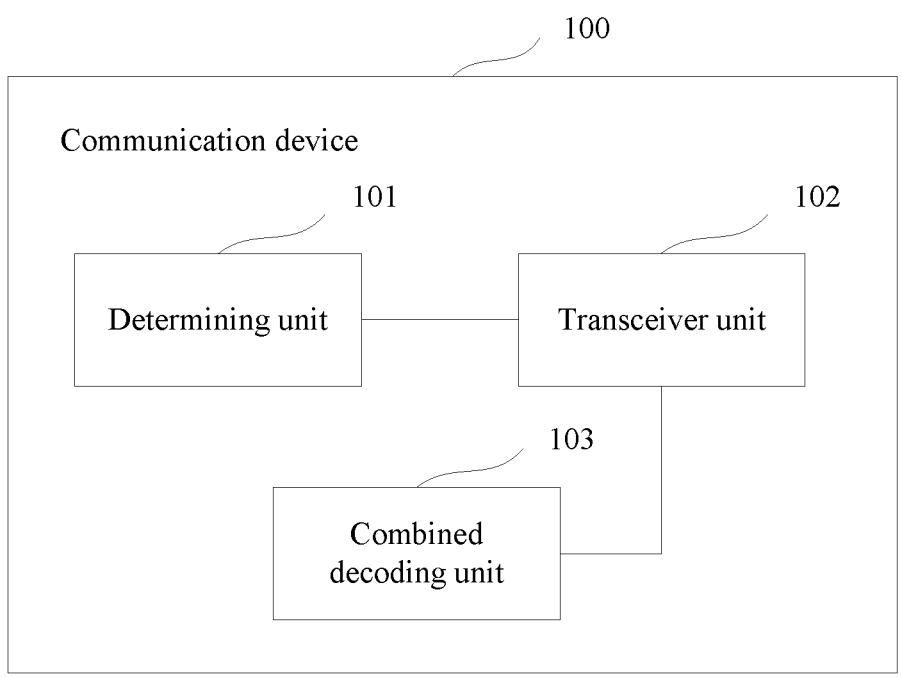

In a sixth implementation, as shown in FIG. 1B, the communication device 100 further includes a combined decoding unit 103.

The combined decoding unit 103 is configured to: when the user equipment receives at least two pieces of downlink control signaling, and all the pieces of downlink control signaling include a same physical resource, perform combined decoding on the at least two pieces of downlink control signaling before the transceiver unit 102 sends or receives data in the parallel HARQ manner based on the at least one piece of downlink control signaling.

In a seventh implementation, the transceiver unit 102 is further configured to:

receive a first carrier parameter before the user equipment receives the at least one piece of downlink control signaling, where the first carrier parameter is used to indicate a first carrier used by the user equipment to receive the at least one piece of downlink control signaling.

The transceiver unit 102 is specifically configured to receive the at least one piece of downlink control signaling in the following way:

receiving the at least one piece of downlink control signaling according to the first carrier indicated by the first carrier parameter.

In an eighth implementation, the determining unit 101 is further configured to:

determine a second carrier parameter before the transceiver unit 102 sends or receives data in the parallel HARQ manner, where the second carrier parameter is used to indicate a second carrier used by the communication device 100 to send or receive the data in the parallel HARQ manner.

The transceiver unit 102 is specifically configured to send or receive data in the parallel HARQ manner in the following way:

sending or receiving data in the parallel HARQ manner according to the second carrier indicated by the second carrier parameter.

Figure 1C:
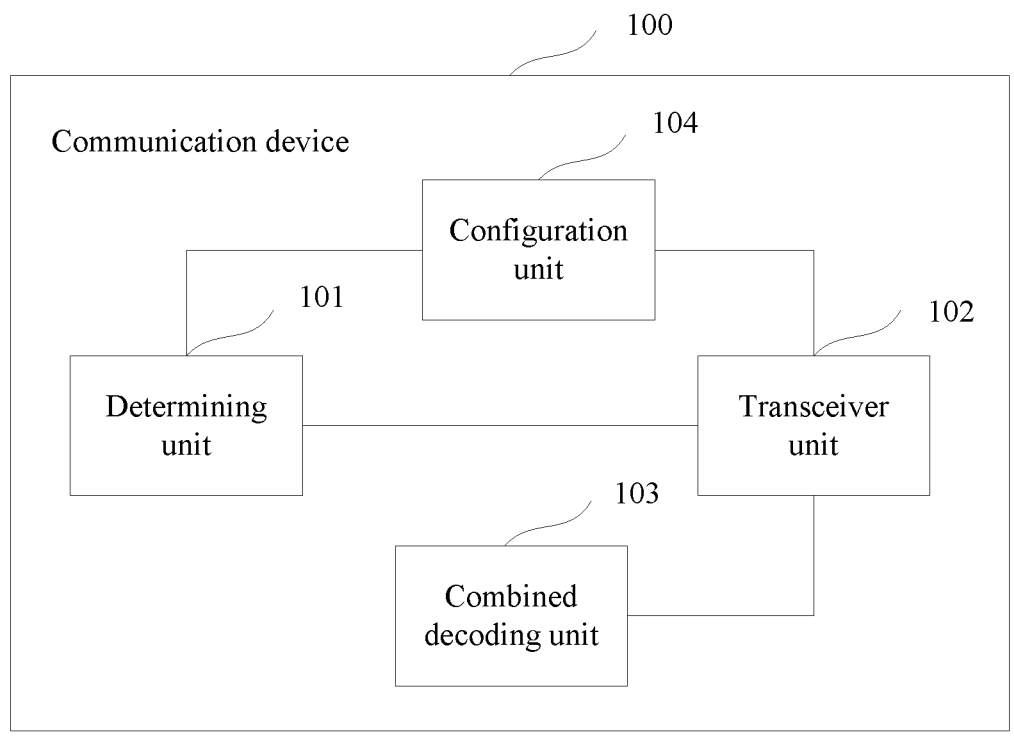

In a ninth implementation, as shown in FIG. 1C, the communication device 100 further includes a configuration unit 104.

The configuration unit 104 is configured to:

when the second carrier includes at least two carriers, configure the at least two subcarriers included in the second carrier as one virtual carrier before the transceiver unit 102 sends or receives the data in the parallel HARQ manner according to the second carrier indicated by the second carrier parameter.

The transceiver unit 102 is specifically configured to send or receive data in the parallel HARQ manner according to the second carrier indicated by the second carrier parameter and in the following way:

sending or receiving data in the parallel HARQ manner on the virtual carrier.

In a tenth implementation, the transceiver unit 102 is further configured to:

before receiving the parallel HARQ communication instruction, send capability information used to represent that the communication device 100 supports sending or receiving data in the parallel HARQ manner.

In an eleventh implementation, the capability information includes a quantity of parallel HARQs used by the communication device 100 to support sending or receiving data in the parallel HARQ manner.

In a twelfth implementation, the quantity of parallel HARQs used by the communication device 100 to support sending or receiving data in the parallel HARQ manner is a quantity that is of carriers for carrier aggregation and that can be supported by the communication device 100.

In a thirteenth implementation, the transceiver unit 102 is further configured to:

after sending or receiving the data in the parallel HARQ manner, send or receive feedback information by using at least one feedback resource.

The feedback resource is an uplink transmission resource determined according to a physical resource used by the downlink control signaling, or a downlink transmission resource determined according to the physical resource used for sending data in the parallel HARQ manner.

Figure 1D:
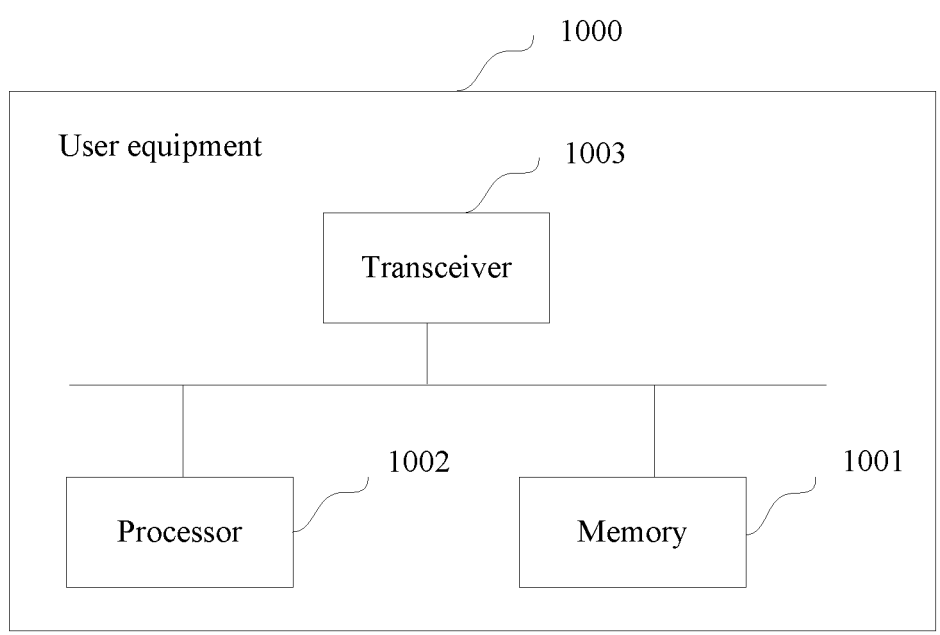
FIG. 1D is a schematic diagram of composition of another communication device according to an embodiment of the present invention.

An embodiment of the present invention further provides a communication device 1000. As shown in FIG. 1D, the communication device 1000 includes a memory 1001, a processor 1002, and a transceiver 1003. In this embodiment of the present invention:

The memory 1001 is configured to store program code executed by the processor 1002.

The processor 1002 is configured to invoke a program stored by the memory 1001; determine a parallel HARQ communication instruction, where the parallel HARQ communication instruction is used to instruct the communication device to send or receive data in a parallel HARQ manner; and control the transceiver 1003 to send or receive data in the parallel HARQ manner according to the determined parallel HARQ communication instruction.

The sending data in the parallel HARQ manner is sending at least one data packet with same content within a same transmission time interval; and the receiving data in the parallel HARQ manner is receiving at least one data packet with same content within a same transmission time interval, and performing combined decoding on the received at least one data packet with same content.

In a first implementation, the communication device 1000 is a network device or user equipment.

In a second implementation, the parallel HARQ communication instruction is a HARQ configuration parameter.

The HARQ configuration parameter is a configuration parameter used by the communication device 1000 to send or receive data in the parallel HARQ manner.

In a third implementation, the HARQ configuration parameter includes a parallel HARQ quantity parameter used by the communication device 1000 to send or receive data in the parallel HARQ manner.

The parallel HARQ quantity parameter includes a largest quantity of parallel HARQs or a specific quantity of parallel HARQs.

In a fourth implementation, if the communication device 1000 is user equipment, the processor is further configured to:

control the transceiver 1003 to receive at least one piece of downlink control signaling before controlling the transceiver 1003 to send or receive data in the parallel HARQ manner, where the at least one piece of downlink control signaling includes a physical resource, a modulation and coding scheme, and a parallel HARQ quantity parameter that are used by the user equipment to send or receive the data in the parallel HARQ manner.

The transceiver 1003 is specifically configured to send or receive data in the parallel HARQ manner in the following way:

sending or receiving data in the parallel HARQ manner based on the physical resource, the modulation and coding scheme, and the parallel HARQ quantity parameter that are indicated in the at least one piece of downlink control signaling.

In a fifth implementation, each of the at least one piece of downlink control signaling includes at least one of all physical resources used by the user equipment to send or receive data in the HARQ manner.

The transceiver 1003 is specifically configured to send or receive data in the parallel HARQ manner based on the physical resource indicated in the at least one piece of downlink control signaling and in the following way:

sending or receiving data in the parallel HARQ manner based on all physical resources indicated in the at least one piece of downlink control signaling.

In a sixth implementation, the processor 1002 is further configured to: when the user equipment receives at least two pieces of downlink control signaling, and all the pieces of downlink control signaling include a same physical resource, perform combined decoding on the at least two pieces of downlink control signaling before the transceiver 1003 sends or receives data in the parallel HARQ manner based on the at least one piece of downlink control signaling.

In a seventh implementation, the processor 1002 is further configured to: control the transceiver 1003 to receive a first carrier parameter before receiving the at least one piece of downlink control signaling, where the first carrier parameter is used to indicate a first carrier used by the user equipment to receive the at least one piece of downlink control signaling.

The transceiver 1003 is specifically configured to receive the at least one piece of downlink control signaling in the following way:

receiving the at least one piece of downlink control signaling according to the first carrier indicated by the first carrier parameter.

In an eighth implementation, the processor 1002 is further configured to:

determine a second carrier parameter before the transceiver 1003 sends or receives data in the parallel HARQ manner, where the second carrier parameter is used to indicate a second carrier used by the communication device 1000 to send or receive the data in the parallel HARQ manner.

The transceiver 1003 is specifically configured to send or receive data in the parallel HARQ manner in the following way:

sending or receiving data in the parallel HARQ manner according to the second carrier indicated by the second carrier parameter.

In a ninth implementation, the processor 1002 is further configured to:

when the second carrier includes at least two carriers, configure the at least two subcarriers included in the second carrier as one virtual carrier before the transceiver 1003 sends or receives the data in the parallel HARQ manner according to the second carrier indicated by the second carrier parameter.

The transceiver 1003 is specifically configured to send or receive data in the parallel HARQ manner according to the second carrier indicated by the second carrier parameter and in the following way:

sending or receiving data in the parallel HARQ manner on the virtual carrier.

In a tenth implementation, the processor 1002 is further configured to: control the transceiver 1003 to send, before receiving the parallel HARQ communication instruction, capability information used to represent that the communication device 1000 supports sending or receiving data in the parallel HARQ manner.

In an eleventh implementation, the capability information includes a quantity of parallel HARQs used by the communication device 1000 to support sending or receiving data in the parallel HARQ manner.

In a twelfth implementation, the quantity of parallel HARQs used by the communication device 1000 to support sending or receiving data in the parallel HARQ manner is a quantity that is of carriers for carrier aggregation and that can be supported by the communication device 1000.

In a thirteenth implementation, the processor is further configured to control the transceiver 1003 to send or receive, after sending or receiving the data in the parallel HARQ manner, feedback information by using at least one feedback resource. The feedback resource is an uplink transmission resource determined according to a physical resource used by the downlink control signaling, or a downlink transmission resource determined according to the physical resource used for sending data in the parallel HARQ manner.

The communication device 100 and the communication device 1000 provided in the embodiments of the present invention send or receive data in the parallel HARQ manner according to the parallel HARQ communication instruction. The at least one data packet with same content is sent or received within a same transmission time, so that the data packet is sent or received in parallel, and a delay can be reduced. In addition, multiple data packets are sent or received within a same transmission time, so that reliability of data transmission is also improved.

Figure 2A:
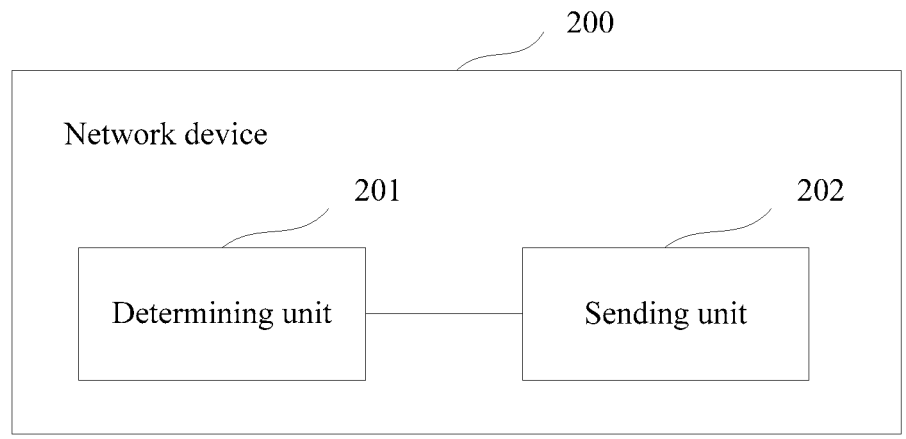
FIG. 2A to FIG. 2C are schematic diagrams of composition of a network device according to an embodiment of the present invention.

An embodiment of the present invention further provides a network device 200. FIG. 2A shows a schematic diagram of composition of the network device 200 provided in this embodiment of the present invention. As shown in FIG. 2A, the network device 200 includes a determining unit 201 and a sending unit 202.

The determining unit 201 is configured to determine a parallel hybrid automatic repeat request HARQ communication instruction, where the parallel HARQ communication instruction is used to instruct user equipment to send or receive data in a parallel HARQ manner.

The sending unit 202 is configured to send the parallel HARQ communication instruction to the user equipment.

The sending data in a parallel HARQ manner is sending at least one data packet with same content within a same transmission time interval; and the receiving data in a parallel HARQ manner is receiving at least one data packet with same content within a same transmission time interval, and performing combined decoding on the received at least one data packet with same content.

In a first implementation, the sending unit 202 is further configured to send data in the parallel HARQ manner according to the parallel HARQ communication instruction determined by the determining unit 201.

Figure 2B:
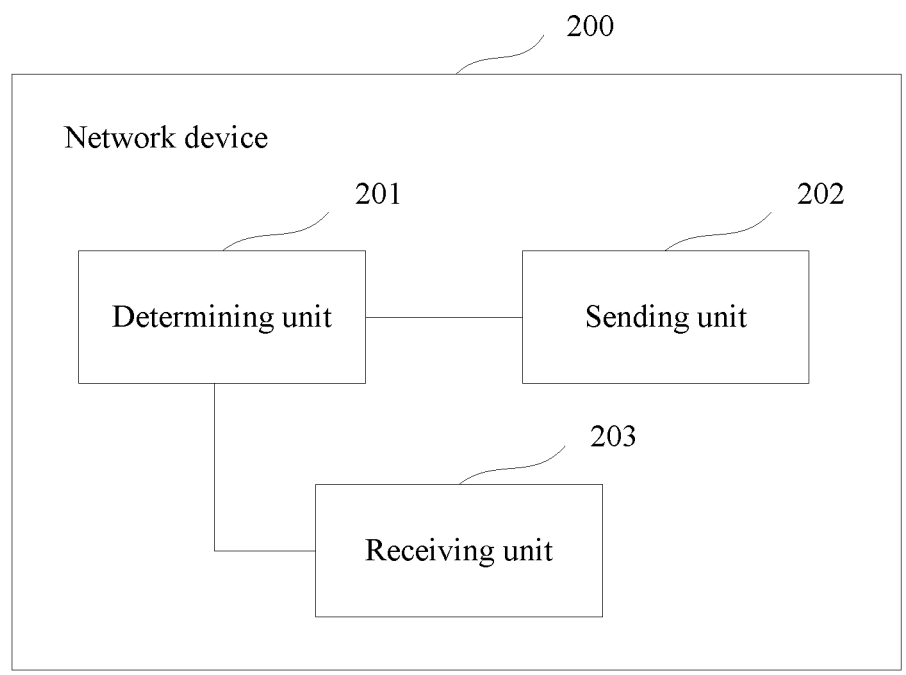

As shown in FIG. 2B, the network device further includes a receiving unit 203.

The receiving unit 203 is configured to receive data in the parallel HARQ manner according to the parallel HARQ communication instruction determined by the determining unit 201.

In a second implementation, the parallel HARQ communication instruction is a HARQ configuration parameter.

The HARQ configuration parameter is a configuration parameter used by the user equipment to send or receive the data in the parallel HARQ manner.

In a third implementation, the HARQ configuration parameter includes a parallel HARQ quantity parameter used by the user equipment to send or receive data in the parallel HARQ manner.

The parallel HARQ quantity parameter includes a largest quantity of parallel HARQs or a specific quantity of parallel HARQs.

Figure 2C:
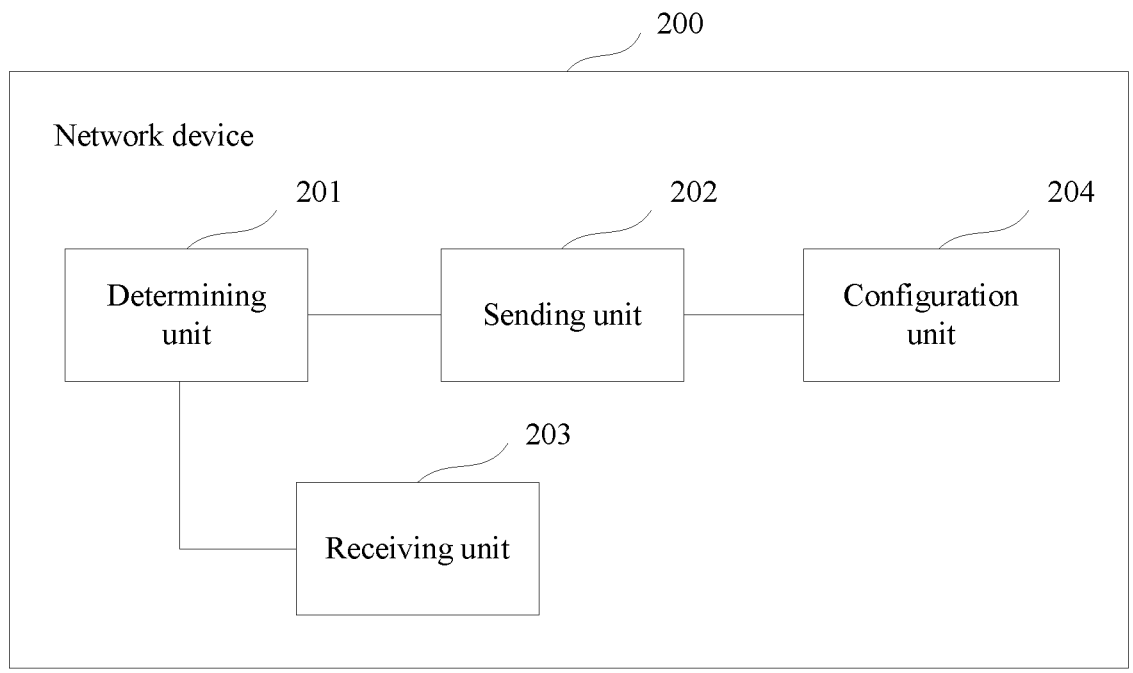

In a fourth implementation, as shown in FIG. 2C, the network device further includes a configuration unit 204. The configuration unit 204 is configured to configure at least one piece of downlink control signaling.

The at least one piece of downlink control signaling includes a physical resource, a modulation and coding scheme, and a parallel HARQ quantity parameter that are used by the user equipment to send or receive data in the parallel HARQ manner.

The sending unit 202 is further configured to send to the user equipment the at least one piece of downlink control signaling configured by the configuration unit 204.

In a fifth implementation, each of the at least one piece of downlink control signaling includes at least one of all physical resources used by the user equipment to send or receive data in the HARQ manner.

In a sixth implementation, there are at least two pieces of downlink control signaling, and all the pieces of downlink control signaling include a same physical resource.

In a seventh implementation, the configuration unit 204 is further configured to:

configure a first carrier parameter, where the first carrier parameter is used to indicate a first carrier used by the user equipment to receive the at least one piece of downlink control signaling.

The sending unit 202 is further configured to send the first carrier parameter to the user equipment.

In an eighth implementation, the network device includes the configuration unit 204, configured to:

configure a second carrier parameter, where the second carrier parameter is used to indicate a second carrier used by the user equipment to send or receive the data in the parallel HARQ manner.

The sending unit 202 is further configured to send the second carrier parameter to the user equipment.

In a ninth implementation, the sending unit 202 is further configured to:

send instruction information to the user equipment when the second carrier includes at least two carriers.

The instruction information is used to instruct the user equipment to configure the at least two subcarriers included in the second carrier as one virtual carrier.

In a tenth implementation, the network device includes the receiving unit 203.

The receiving unit 203 is configured to: before the determining unit 201 determines the parallel hybrid automatic repeat request HARQ communication instruction, receive capability information sent by the user equipment and used to represent that the user equipment supports sending or receiving the data in the parallel HARQ manner.

In an eleventh implementation, the network device includes the receiving unit 203.

The receiving unit 203 is configured to receive, by using at least one uplink feedback resource, feedback information sent by the user equipment, where the at least one uplink feedback resource is a transmission resource determined according to a physical resource used by the downlink control signaling.

The sending unit 202 is further configured to:

send feedback information to the user equipment by using at least one downlink feedback resource, where the at least one downlink feedback resource is a transmission resource determined according to the physical resource used for sending data in the parallel HARQ manner.

Figure 2D:
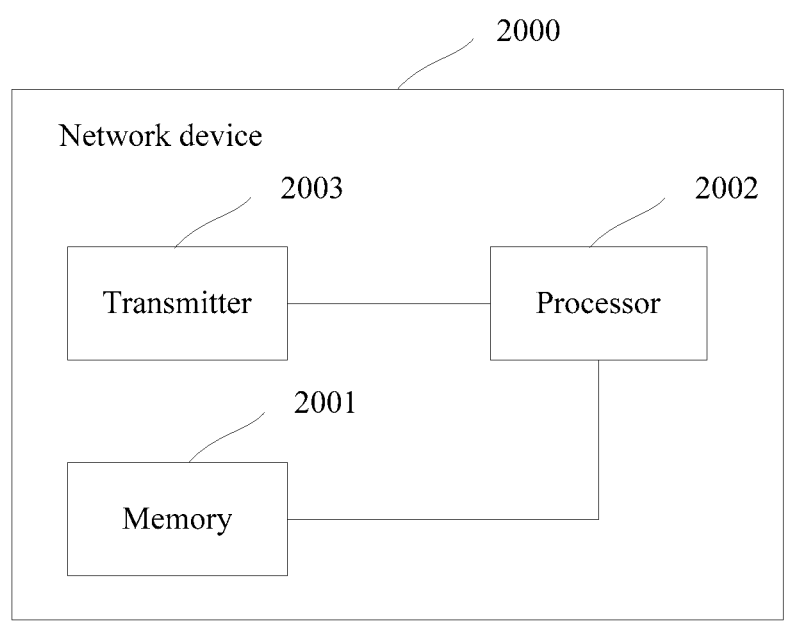
FIG. 2D to FIG. 2E are schematic diagrams of composition of another network device according to an embodiment of the present invention.

An embodiment of the present invention further provides a network device 2000. As shown in FIG. 2D, the network device 2000 provided in this embodiment of the present invention includes a memory 2001, a processor 2002, and a transmitter 2003. In this embodiment of the present invention:

The memory 2001 is configured to store program code executed by the processor 2002.

The processor 2002 is configured to: invoke a program stored by the memory 2001, and determine a parallel HARQ communication instruction, where the parallel HARQ communication instruction is used to instruct user equipment to send or receive data in a parallel HARQ manner. The sending data in a parallel HARQ manner is sending at least one data packet with same content within a same transmission time interval; and the receiving data in a parallel HARQ manner is receiving at least one data packet with same content within a same transmission time interval, and performing combined decoding on the received at least one data packet with same content.

The transmitter 2003 is configured to send the parallel HARQ communication instruction to the user equipment.

In a first implementation, the transmitter 2003 is further configured to send data in the parallel HARQ manner.

Figure 2E:
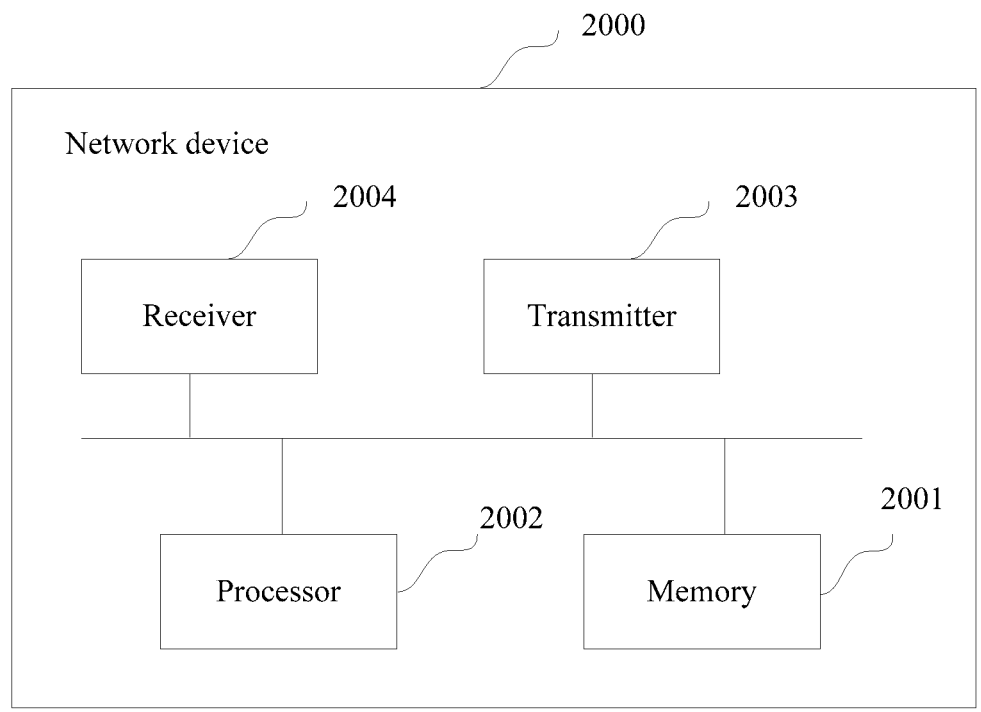

As shown in FIG. 2E, the network device 2000 further includes a receiver 2004.

The receiver 2004 is configured to receive data in the parallel HARQ manner.

In a second implementation, the parallel HARQ communication instruction is a HARQ configuration parameter.

The HARQ configuration parameter is a configuration parameter used by the user equipment to send or receive the data in the parallel HARQ manner.

In a third implementation, the HARQ configuration parameter includes a parallel HARQ quantity parameter used by the user equipment to send or receive data in the parallel HARQ manner.

The parallel HARQ quantity parameter includes a largest quantity of parallel HARQs or a specific quantity of parallel HARQs.

In a fourth implementation, the processor 2002 is further configured to configure at least one piece of downlink control signaling.

The at least one piece of downlink control signaling includes a physical resource, a modulation and coding scheme, and a parallel HARQ quantity parameter that are used by the user equipment to send or receive data in the parallel HARQ manner.

The transmitter 2003 is further configured to send the at least one piece of downlink control signaling to the user equipment.

In a fifth implementation, each of the at least one piece of downlink control signaling includes at least one of all physical resources used by the user equipment to send or receive data in the HARQ manner.

In a sixth implementation, there are at least two pieces of downlink control signaling, and all the pieces of downlink control signaling include a same physical resource.

In a seventh implementation, the processor 2002 is further configured to:

configure a first carrier parameter, where the first carrier parameter is used to indicate a first carrier used by the user equipment to receive the at least one piece of downlink control signaling.

The transmitter 2003 is further configured to send the first carrier parameter to the user equipment.

In an eighth implementation, the processor 2002 is further configured to:

configure a second carrier parameter, where the second carrier parameter is used to indicate a second carrier used by the user equipment to send or receive the data in the parallel HARQ manner.

The transmitter 2003 is further configured to send the second carrier parameter to the user equipment.

In a ninth implementation, the transmitter 2003 is further configured to:

send instruction information to the user equipment when the second carrier includes at least two carriers.

The instruction information is used to instruct the user equipment to configure the at least two subcarriers included in the second carrier as one virtual carrier.

In a tenth implementation, the network device 2000 includes the receiver 2004, and the receiver 2004 is configured to: before the determining unit 201 determines the parallel hybrid automatic repeat request HARQ communication instruction, receive capability information sent by the user equipment and used to represent that the user equipment supports sending or receiving the data in the parallel HARQ manner.

In an eleventh implementation, the network device 2000 includes the receiver 2004, and the receiver 2004 is configured to receive, by using at least one uplink feedback resource, feedback information sent by the user equipment, where the at least one uplink feedback resource is a transmission resource determined according to a physical resource used by the downlink control signaling. The transmitter 2003 is further configured to send feedback information to the user equipment by using at least one downlink feedback resource, where the at least one downlink feedback resource is a transmission resource determined according to the physical resource used for sending data in the parallel HARQ manner.

The network device 200 and the network device 2000 provided in the embodiments of the present invention determine the parallel HARQ communication instruction, and send the determined parallel HARQ communication instruction to the user equipment, so that the user equipment sends or receives data in the parallel HARQ manner, and the network device 200 can also send or receive data in the parallel HARQ manner according to the parallel HARQ communication instruction. Therefore, the at least one data packet with same content is sent or received within a same transmission time, so that the data packet is sent or received in parallel, and a delay can be reduced. In addition, multiple data packets are sent or received within a same transmission time, so that reliability of data transmission is also improved.

It should be noted that the memory in the foregoing embodiments of the present invention may be a read-only memory (ROM) or a random access memory (RAM), or may be an electrically erasable programmable read-only memory (EEPROM), a magnetic disk storage medium or another magnetic storage device, or any other medium that can be used to carry or store expected program code in a form of an instruction or a data structure and that can be accessed by a computer. However, the memory is not limited thereto. For example, the memory may be a combination of the foregoing memories.

The processor in the embodiments of the present invention may be a general-purpose central processing unit.

Figure 3:
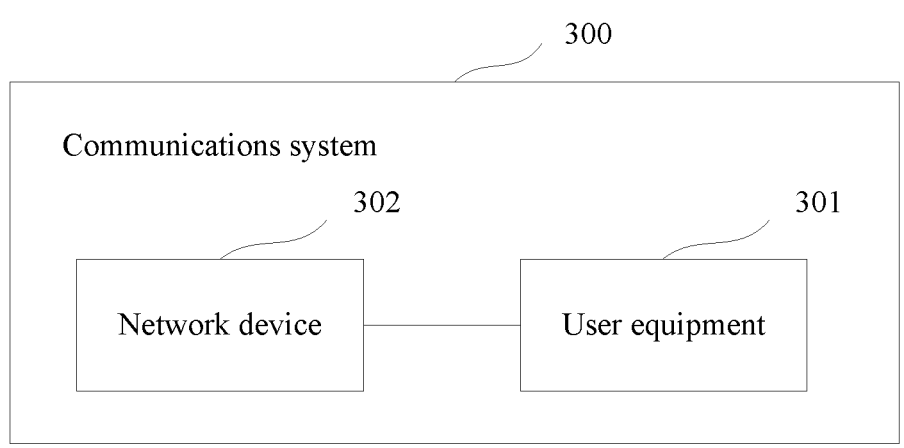
FIG. 3 is a schematic diagram of composition of a communications system according to an embodiment of the present invention.

An embodiment of the present invention further provides a communications system 300. As shown in FIG. 3, the communications system includes user equipment 301 and a network device 302.

The user equipment 301 and the network device 302 perform communication negotiation for parallel HARQ transmission, that is, determine a parallel HARQ communication instruction, and when it is determined to perform sending or receiving in a parallel HARQ manner, send or receive data in the parallel HARQ manner.

In this embodiment of the present invention, the user equipment 301 may be the communication device 100 or the communication device 1000 shown in FIG. 1A to FIG. 1D, and the network device 302 may be the network device 200 or the network device 2000 shown in FIG. 2A to FIG. 2E. The user equipment 301 may receive the parallel HARQ communication instruction determined by the network device 302, and may send or receive data in the parallel HARQ manner. In this embodiment of the present invention, for an execution function of the user equipment 301, details are not described herein again in this embodiment of the present invention, and reference may be made to related description on the communication device 100 or the communication device 1000. For a communication method in which data is sent or received in the parallel HARQ manner and that is specifically executed by the user equipment 301, reference may be made to description in the following related embodiments.

In this embodiment of the present invention, the network device 302 may be the communication device 100 or the communication device 1000 shown in FIG. 1A to FIG. 1D, or may be the network device 200 or the network device 2000 shown in FIG. 2A to FIG. 2E, and implements a corresponding function in a specific application. Details are not described herein again in this embodiment of the present invention.

According to the communication method provided in the embodiments of the present invention, a communication device determines a parallel HARQ communication instruction, and sends or receives data in a parallel HARQ manner according to the parallel HARQ communication instruction. In the embodiments of the present invention, the parallel HARQ communication instruction is used to instruct the communication device to send or receive data in the parallel HARQ manner. For example, the parallel HARQ communication instruction may be a HARQ configuration parameter used by the communication device to send or receive data in the parallel HARQ manner. The sending data in the parallel HARQ manner by the communication device is sending, by the communication device, at least one data packet with same content within a same transmission time interval; and the receiving data in the parallel HARQ manner by the communication device is receiving, by the communication device, at least one data packet with same content within a same transmission time interval, and performing combined decoding on the received at least one data packet with same content.

In the embodiments of the present invention, the communication device may determine carrier information included in, for example, the HARQ configuration parameter, and may send or receive data in the parallel HARQ manner on a carrier indicated in the determined carrier information. When the carrier indicated in the carrier information includes at least two carriers, the communication device may further configure the at least two subcarriers included in the carrier as one virtual carrier, and send or receive the data in the parallel HARQ manner on the virtual carrier.

The communication device in the embodiments of the present invention may be a network device, or may be user equipment.

The present invention describes in detail the communication method provided in the embodiments of the present invention with reference to specific embodiments below.

Figure 4:
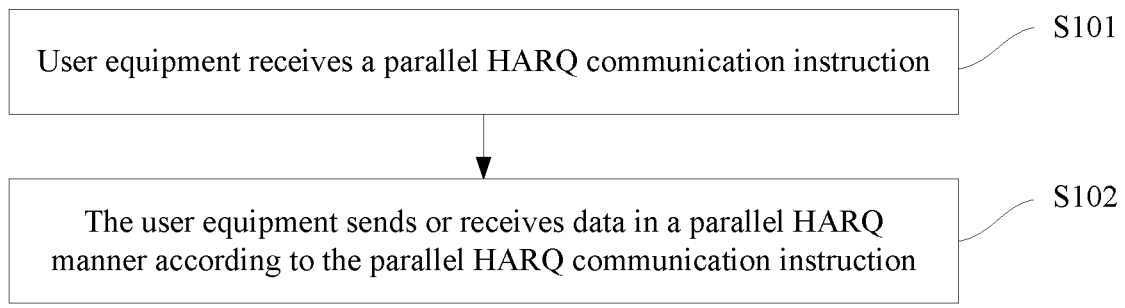
FIG. 4 is a first flowchart of a communication method according to an embodiment of the present invention.

FIG. 4 shows a flowchart of a communication method according to an embodiment of the present invention. The communication method shown in FIG. 4 is executed by user equipment, that is, a communication device is user equipment. As shown in FIG. 4, the method includes the following steps.

S101. The user equipment determines a parallel HARQ communication instruction.

In this embodiment of the present invention, the parallel HARQ communication instruction is used to instruct the user equipment to send or receive data in a parallel HARQ manner.

The sending data in a parallel HARQ manner by the user equipment is sending, by the user equipment, at least one data packet with same content within a same transmission time interval. For example, the user equipment may send at least one data packet with same content to a base station on different physical resources within a same transmission time interval such as a TTI (Transmission Time Interval).

Specifically, the same content may be understood as that content included in MAC service data units (MAC SDU) is totally the same, or content included in Media Access Control packet data units (MAC PDU) is totally the same, or content of transport blocks (TB) is the same.

The receiving data in a parallel HARQ manner by the user equipment is receiving, by the user equipment, at least one data packet with same content within a same transmission time interval, and performing combined decoding on the received at least one data packet with same content. For example, the user equipment may receive, on different physical resources within a same transmission time interval such as a TTI, at least one data packet with same content sent by a base station, and performs combined decoding on multiple data packets with same content, so as to further increase a data decoding success rate.

Specifically, combined decoding may be that the user equipment directly performs combined decoding on multiple data packets with same content, or the user equipment first performs decoding on some of multiple data packets, and if the decoding does not succeed, performs combined decoding on all the multiple data packets with same content. A specific decoding procedure is not limited in the present invention.

It should be noted that in this embodiment of the present invention, a specific transmission time interval within which the user equipment sends or receives the data is not limited in this embodiment of the present invention.

It should be further noted that in this embodiment of the present invention, the parallel HARQ communication instruction determined by the user equipment may be sent by a network device such as an eNB, and the user equipment receives the parallel HARQ communication instruction sent by the network device. This is not limited in this embodiment of the present invention.

S102. The user equipment sends or receives data in a parallel HARQ manner according to the parallel HARQ communication instruction.

In this embodiment of the present invention, the sending data in a parallel HARQ manner by the user equipment may be sending, by the user equipment, uplink data to a network device such as an eNB.

Specifically, when the user equipment sends uplink data in the parallel HARQ manner, the user equipment performs multiple HARQ transmissions at the same time according to a command, such as an uplink grant, of the network device such as an eNB and the parallel HARQ communication instruction such as an uplink HARQ configuration parameter, so as to map the uplink data to multiple different physical resources (including at least one different domain of time, a frequency domain, a code domain, or the like) for parallel transmission.

In this embodiment of the present invention, the receiving data in a parallel HARQ manner by the user equipment may be receiving, by the user equipment, downlink data sent by a network device such as an eNB.

Specifically, when the user equipment receives downlink data in the parallel HARQ manner, the user equipment may perform multiple HARQ transmissions at the same time according to a command, such as a downlink assignment (DL Assignment), of the network device such as an eNB and the parallel HARQ communication instruction such as a downlink HARQ configuration parameter, for example, performs parallel transmission on multiple different physical resources (including time, a frequency domain, a code domain, and the like). Further, the user equipment may also perform combined decoding on multiple pieces of data transmitted in parallel.

Specifically, in this embodiment of the present invention, the physical resource used by the user equipment to send uplink data in the parallel HARQ manner or to receive downlink data in the parallel HARQ manner may be indicated in the command sent by the eNB. For example, information about all physical resources used for multiple parallel HARQ transmissions may be carried in the command sent by the eNB; or information about a part of physical resources used for multiple parallel HARQ transmissions may be carried in the command sent by the eNB, and information about another physical resource is indicated in the parallel HARQ communication instruction such as the HARQ configuration parameter. For example, the command sent by the eNB indicates a physical resource 1, and another physical resource is indicated by the configuration parameter. Alternatively, a part of physical resources are indicated by the command sent by the eNB, and another physical resource is indicated by the parallel HARQ communication instruction such as a rule in the HARQ configuration parameter, and by the command sent by eNB. For example, the command sent by the eNB indicates the physical resource 1, and the rule in the HARQ configuration parameter is that physical resources are successively used; therefore, the user equipment may determine all used physical resources according to the command and the rule.

In this embodiment of the present invention, the user equipment sends or receives data in the parallel HARQ manner according to the parallel HARQ communication instruction. The at least one data packet with same content is sent or received within the same transmission time interval, so that the data packet is sent or received in parallel, and a delay can be reduced. In addition, multiple data packets are sent or received within a same transmission time, so that reliability of data transmission is also improved.

Figure 5:
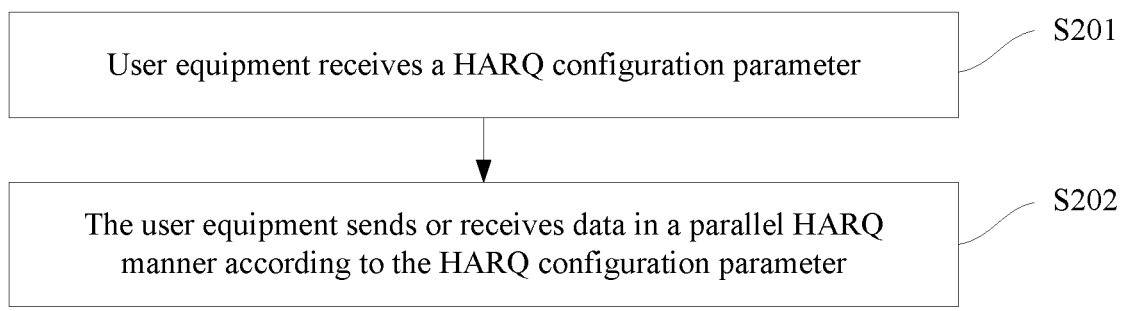
FIG. 5 is a second flowchart of a communication method according to an embodiment of the present invention.

Optionally, in this embodiment of the present invention, the parallel HARQ communication instruction may be a HARQ configuration parameter, and the HARQ configuration parameter is a configuration parameter used by the user equipment to send or receive the data in the parallel HARQ manner. A specific execution process is shown in FIG. 5, and includes the following steps.

S201. The user equipment receives a HARQ configuration parameter.

Optionally, in this embodiment of the present invention, the HARQ configuration parameter may include a parallel HARQ quantity parameter used by the user equipment to send or receive data in the parallel HARQ manner. The parallel HARQ quantity parameter includes a largest quantity or a specific quantity of parallel HARQs executed each time the user equipment sends or receives the data.

In this embodiment of the present invention, when the parallel HARQ quantity parameter includes the largest quantity of parallel HARQs, a current specific quantity of parallel HARQs executed when the data is sent or received may be notified in another signaling notification manner, such as a downlink control signaling notification manner, so that physical channel resource overheads are reduced, and a different quantity of parallel HARQs may be used each time the user equipment sends or receives the data, to dynamically adapt to a channel condition change, and ensure low-delay and highly-reliable data sending or receiving.

It should be noted that in this embodiment of the present invention, different content may be included in the HARQ configuration parameter according to an actual situation. For example, the HARQ configuration parameter may further include parameter information used for indicating carrier information, feedback resource information, and the like that are used by the user equipment to send or receive data in the parallel HARQ manner. This is not limited in this embodiment of the present invention.

It should be further noted that in this embodiment of the present invention, the HARQ configuration parameter may include an uplink HARQ configuration parameter and a downlink HARQ configuration parameter. The uplink HARQ configuration parameter is used to indicate a configuration parameter required by the user equipment for sending the data in the parallel HARQ manner, and the downlink HARQ configuration parameter is used to indicate a configuration parameter required by the user equipment for receiving the data in the parallel HARQ manner. Certainly, this embodiment of the present invention is not limited to the foregoing manners.

In this embodiment of the present invention, the user equipment may receive the HARQ configuration parameter by using a radio resource control (RRC) message such as a system message, or a dedicated RRC message such as an RRC connection reconfiguration message. Certainly, a specific manner of receiving the HARQ configuration parameter is not limited in this embodiment of the present invention. For example, the HARQ configuration parameter may further be received by using a physical layer message or a Media Access Control (MAC) layer message.

S202. The user equipment sends or receives the data in a parallel HARQ manner according to the HARQ configuration parameter.

In this embodiment of the present invention, the user equipment sends or receives data in the parallel HARQ manner according to the received HARQ configuration parameter, so that data is sent or received in the parallel HARQ manner by using fewer singling overheads, a delay is reduced, and reliability is improved.

Figure 6:
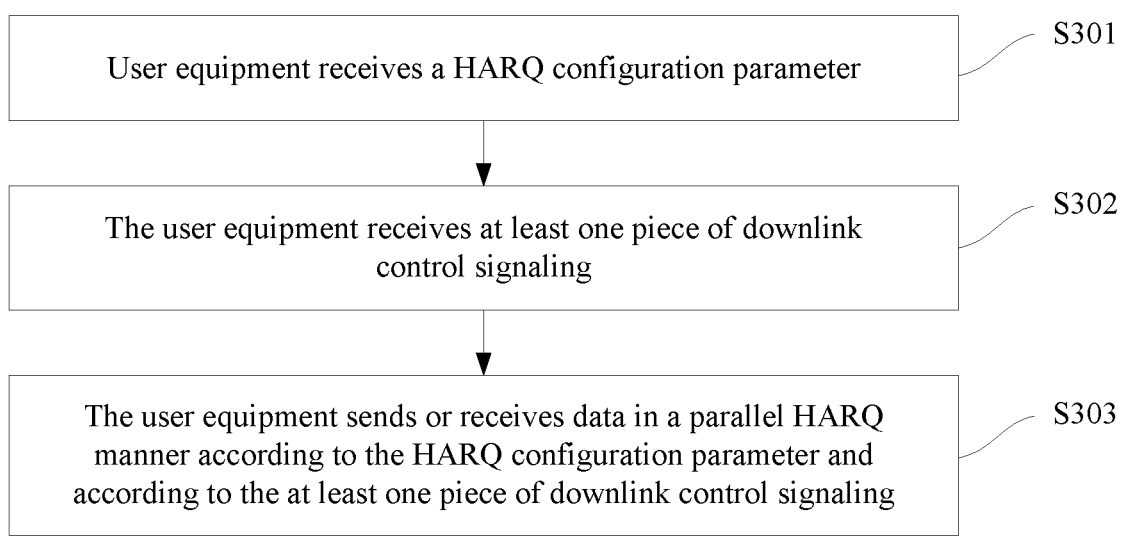
FIG. 6 is a third flowchart of a communication method according to an embodiment of the present invention.

Optionally, based on the communication execution process shown in FIG. 4 and FIG. 5, in this embodiment of the present invention, before sending or receiving the data in the parallel HARQ manner according to the parallel HARQ communication instruction, the user equipment may further receive downlink control signaling, and send or receive the data in the parallel HARQ manner according to a physical resource, a modulation and coding scheme, and a parallel HARQ quantity parameter that are included in the downlink control signaling and that are used by the user equipment to send or receive the data in the parallel HARQ manner. In this embodiment of the present invention, an example in which the method shown in FIG. 5 includes the foregoing execution manner is used for description. As shown in FIG. 6, the method includes the following steps.

S301. The user equipment receives a HARQ configuration parameter.

S302. The user equipment receives at least one piece of downlink control signaling.

In this embodiment of the present invention, the at least one piece of downlink control signaling includes a physical resource, a modulation and coding scheme, and a parallel HARQ quantity parameter that are used by the user equipment to send or receive the data in the parallel HARQ manner. Certainly, in this embodiment of the present invention, the downlink control signaling may also include at least one of the physical resource, the modulation and coding scheme, or the parallel HARQ quantity parameter that is used by the user equipment to send or receive the data in the parallel HARQ manner. The user equipment may be notified, in another manner, of information not included in the downlink control signaling, for example, the HARQ configuration parameter may be used for notification.

It should be noted that in this embodiment of the present invention, the parallel HARQ quantity parameter included in the downlink control signaling may be a largest quantity or a specific quantity of parallel HARQs executed each time the user equipment sends or receives the data. Certainly, when the HARQ configuration parameter already includes the specific quantity of parallel HARQs executed each time the user equipment sends or receives the data, the specific quantity of parallel HARQs does not need to be included in the downlink control signaling.

S303. The user equipment sends or receives data in a parallel HARQ manner according to the HARQ configuration parameter and according to the at least one piece of downlink control signaling.

In this embodiment of the present invention, the user equipment is notified, in a downlink control signaling manner, of information such as the physical resource, the modulation and coding scheme, and the parallel HARQ quantity parameter that are used by the user equipment to send or receive the data in the parallel HARQ manner, so that not all parameter information for executing parallel HARQs needs to be included in the HARQ communication instruction.

It should be noted that in this embodiment of the present invention, S301 and S302 may be executed in any sequence, or S301 and S302 may be executed in parallel, and the procedure shown in FIG. 6 is only an example for description.

In this embodiment of the present invention, the user equipment may receive the downlink control signaling by using a radio resource control (RRC) message such as a system message, or a dedicated RRC message such as an RRC connection reconfiguration message. Certainly, a specific manner of receiving the downlink control signaling is not limited in this embodiment of the present invention, for example, the downlink control signaling may further be received by using a physical layer message or a Media Access Control (MAC) layer message.

In this embodiment of the present invention, the at least one piece of downlink control signaling may be received only by using a physical layer message. Optionally, when the at least one piece of downlink control signaling is received only by using a physical layer message, each of the at least one piece of downlink control signaling includes at least one of all physical resources used by the user equipment to send or receive the data in the parallel HARQ manner.

Specifically, all physical resources are a collection of physical resources used for sending or receiving all HARQs when the data is sent or received in the parallel HARQ manner.

Figure 7:
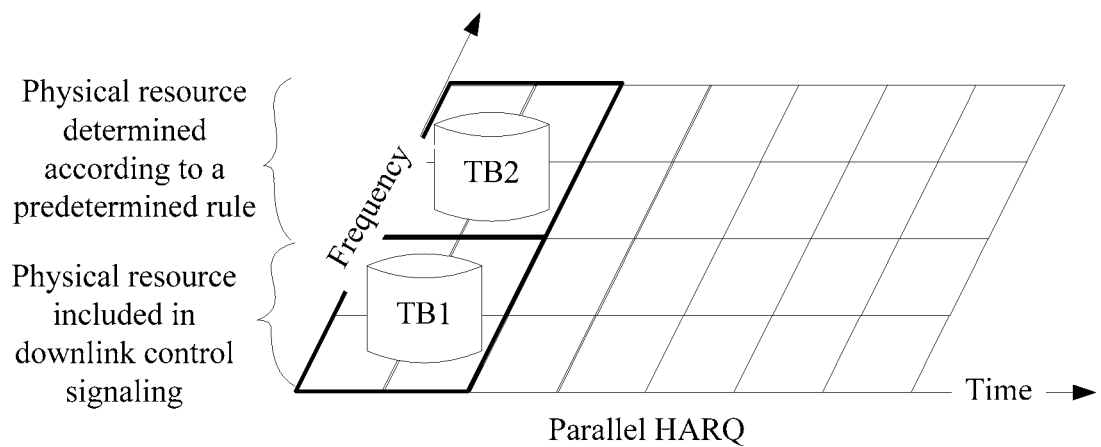
FIG. 7 is a schematic diagram of determining a physical resource according to a predetermined rule according to an embodiment of the present invention.

Specifically, if there is one piece of downlink control signaling, the downlink control signaling may include all physical resources used by the user equipment, or may include a part of physical resources in all physical resources used by the user equipment. When the downlink control signaling includes a part of physical resources in all physical resources, another physical resource used by the user equipment may be obtained by using the physical resource included in the downlink control signaling and a predetermined rule. For example, the downlink control signaling includes a physical resource, and the predetermined rule is that a preset quantity of physical resources successive to the physical resource included in the downlink control signaling in a frequency domain are also physical resources allocated to the user equipment for use. As shown in FIG. 7, a physical resource included in the downlink control signaling is TB1, and a next physical resource TB2 successive to TB1 in the frequency domain is also a physical resource used by the user equipment. Certainly, the predetermined rule may also be in another manner. For example, a physical resource that is at a fixed interval with a physical resource included in the downlink control signaling in the frequency domain is a physical resource allocated to the user equipment for use. This is not limited in this embodiment of the present invention.

The user equipment obtains, by using the downlink control signaling or the downlink control signaling and the predetermined rule, all the physical resources used for sending or receiving the data in the HARQ manner, and sends or receives the data in the parallel HARQ manner by using all the physical resources. Each physical resource is corresponding to sending or receiving of one HARQ.

Specifically, if there are at least two pieces of downlink control signaling, the at least two pieces of downlink control signaling may include all physical resources used by the user equipment, or may include a part of physical resources used by the user equipment. Likewise, when the downlink control signaling includes a part of physical resources in all physical resources, another physical resource used by the user equipment may be obtained by using the physical resource included in the downlink control signaling and the predetermined rule.

Further, all of the at least two pieces of downlink control signaling may include a same physical resource or different physical resources. For example, when the user equipment receives two pieces of downlink control signaling: downlink control signaling 1 and downlink control signaling 2, and uses two physical resources: a physical resource 1 and a physical resource 2, where each physical resource is corresponding to sending or receiving of one HARQ, there may be the following several manners.

Figure 8:
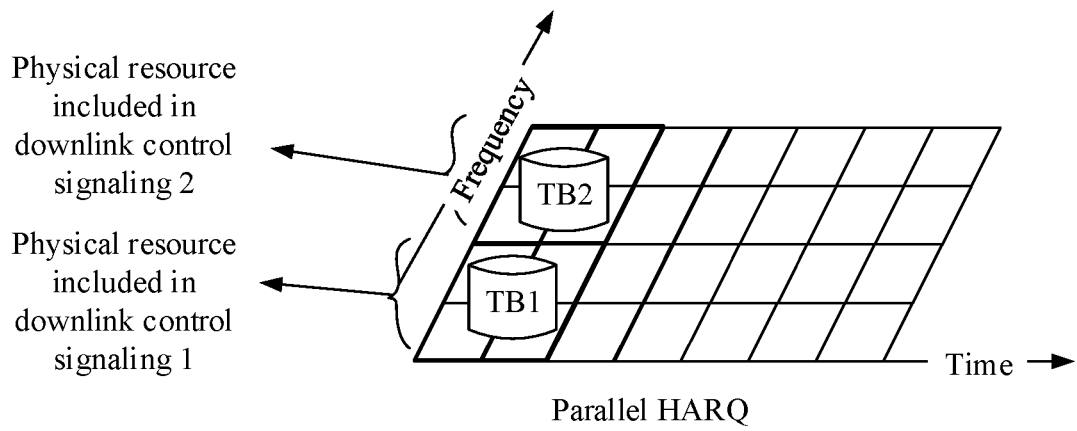
FIG. 8 is a first schematic diagram of a physical resource included in downlink control signaling according to an embodiment of the present invention.

Manner 1: As shown in FIG. 8, the downlink control signaling 1 includes the physical resource 1, and the downlink control signaling 2 includes the physical resource 2.

Figure 9:
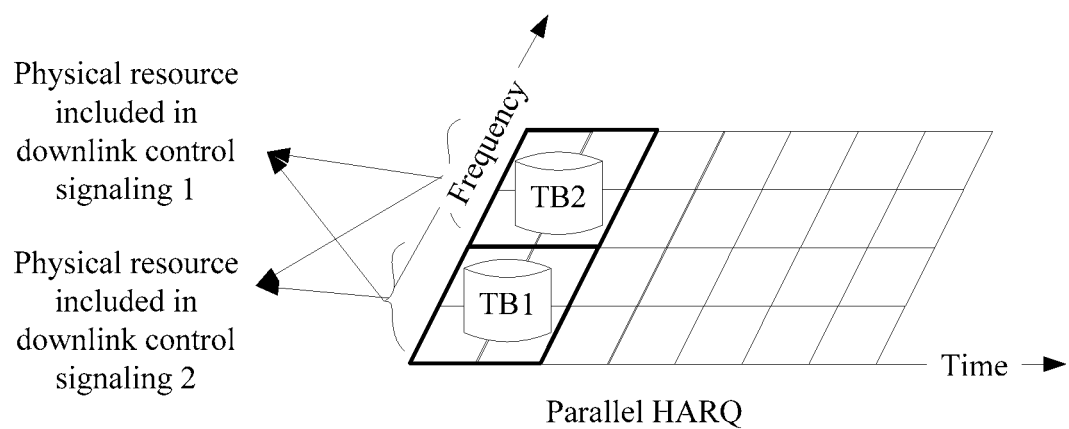
FIG. 9 is a second schematic diagram of a physical resource included in downlink control signaling according to an embodiment of the present invention.

Manner 2: As shown in FIG. 9, the downlink control signaling 1 includes the physical resource 1 and the physical resource 2, and the downlink control signaling 2 includes the physical resource 1 and the physical resource 2.

Figure 10:
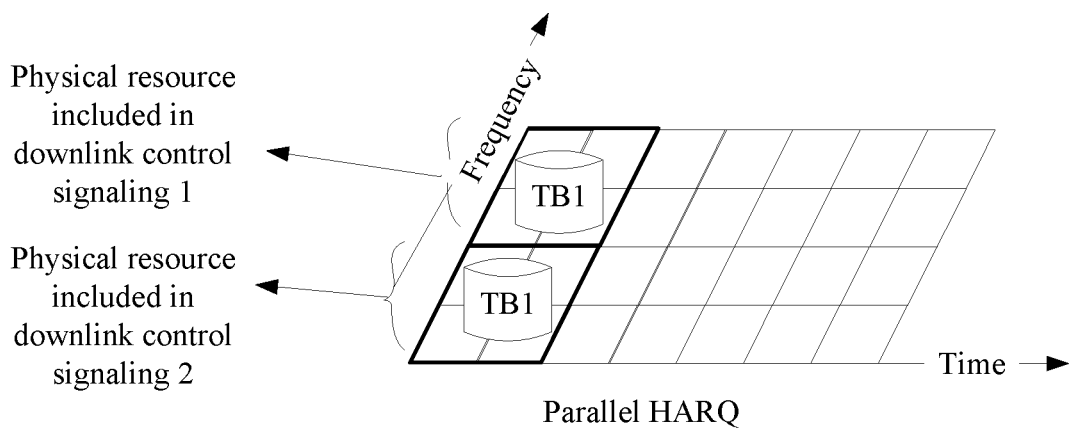
FIG. 10 is a third schematic diagram of a physical resource included in downlink control signaling according to an embodiment of the present invention.

Manner 3: As shown in FIG. 10, the downlink control signaling 1 includes the physical resource 1, the downlink control signaling 2 includes the physical resource 1, and the user equipment obtains the physical resource 2 by using a predetermined rule. Certainly, it is also possible that the downlink control signaling 1 includes the physical resource 2, the downlink control signaling 2 includes the physical resource 2, and the user equipment obtains the physical resource 1 by using a predetermined rule.

In this embodiment of the present invention, as opposed to a conventional manner in which one piece of signaling is corresponding to one physical resource, in the foregoing manner in which at least one of all the physical resources used by the user equipment to send or receive the data in the HARQ manner is included in each of the at least one piece of downlink control signaling, the user equipment uses all the physical resources to send or receive the data in the parallel HARQ manner, and this can reduce signaling overheads.

When the user equipment receives at least two pieces of downlink control signaling, and all the pieces of downlink control signaling include a same physical resource, for example, in the foregoing second and third forms, the physical resources used by the user equipment to send or receive the data in the parallel HARQ manner may be obtained, provided that the user equipment can successfully decode one piece of downlink control signaling. Therefore, reliability can be improved.

Figure 11:
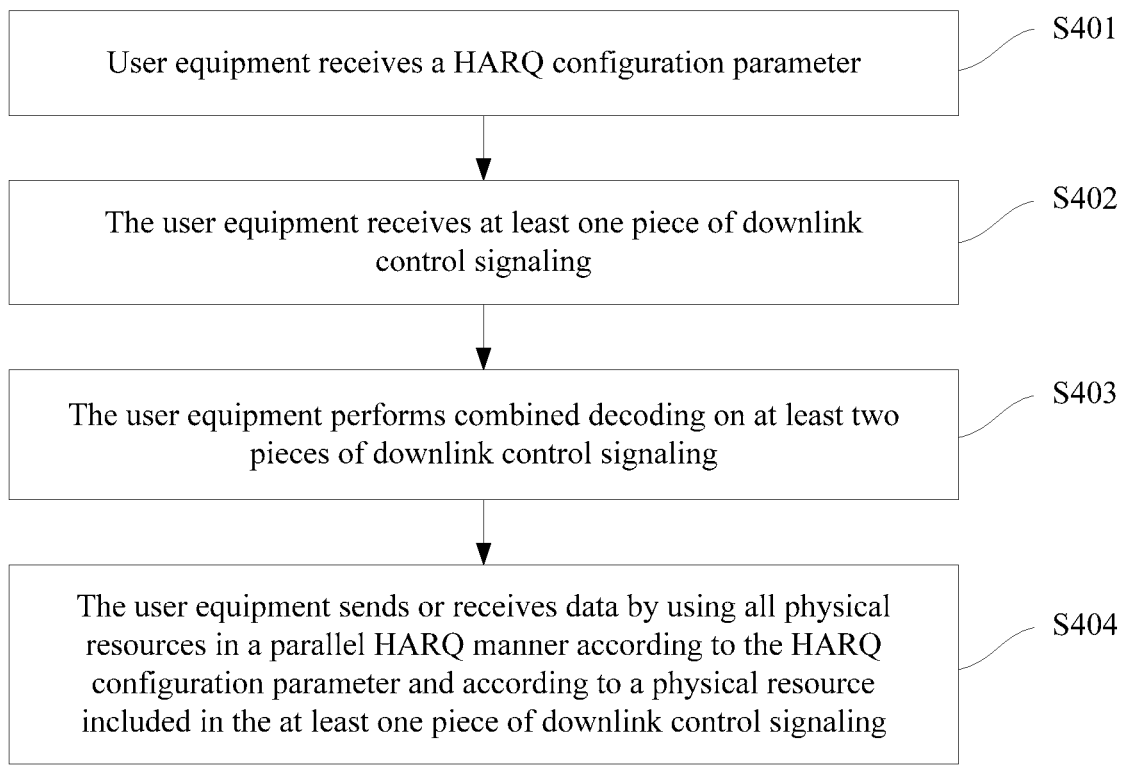
FIG. 11 is a fourth flowchart of a communication method according to an embodiment of the present invention.

Further, when the user equipment receives at least two pieces of downlink control signaling, and all the pieces of downlink control signaling include a same physical resource, the user equipment may perform combined decoding on the at least two pieces of downlink control signaling, to further improve reliability of downlink control signaling transmission. A specific execution process is shown in FIG. 11, and includes the following steps.

S401. The user equipment receives a HARQ configuration parameter.

S402. The user equipment receives at least one piece of downlink control signaling.

The user equipment receives at least two pieces of downlink control signaling, and all the pieces of downlink control signaling include a same physical resource.

S403. The user equipment performs combined decoding on at least two pieces of downlink control signaling.

S404. The user equipment sends or receives the data by using all physical resources in a parallel HARQ manner according to the HARQ configuration parameter and according to a physical resource included in the at least one piece of downlink control signaling.

Optionally, in this embodiment of the present invention, before the user equipment receives the at least one piece of downlink control signaling, the following step is further included.

S402a. The user equipment receives a first carrier parameter, where the first carrier parameter is used to indicate a first carrier used by the user equipment to receive the at least one piece of downlink control signaling.

In this case, the user equipment may receive the at least one piece of downlink control signaling specifically in the following way:

receiving, by the user equipment, the at least one piece of downlink control signaling according to the first carrier indicated by the first carrier parameter.

Figure 12:
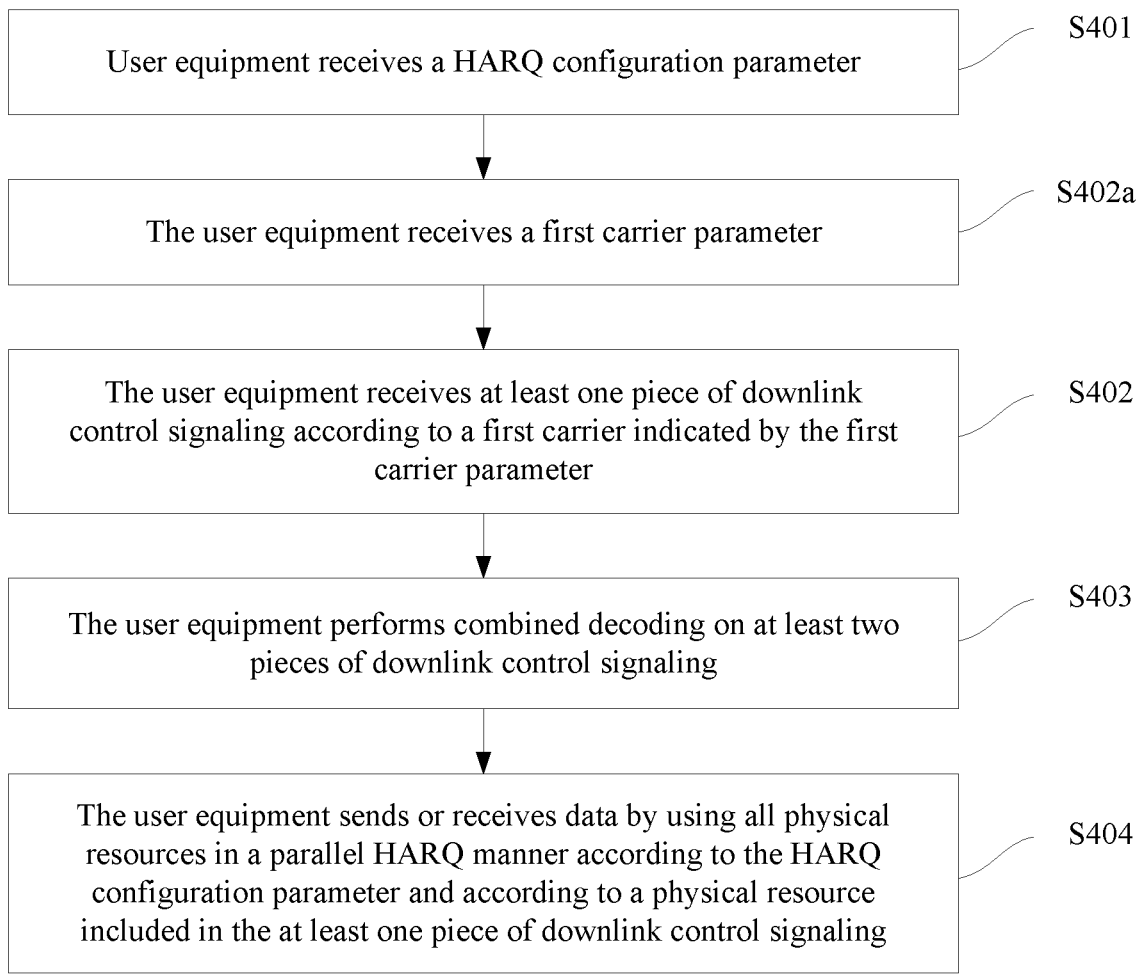
FIG. 12 is a fifth flowchart of a communication method according to an embodiment of the present invention.

For a specific method flowchart including the execution step S402a in this embodiment of the present invention, reference may be made to FIG. 12.

Optionally, before the user equipment sends or receives the data in the parallel HARQ manner, the following step is further included.

S404a. The user equipment receives a second carrier parameter, where the second carrier parameter is used to indicate a second carrier used by the user equipment to send or receive the data in the parallel HARQ manner.

In this case, the user equipment may send or receive the data in the parallel HARQ manner specifically in the following way:

sending or receiving, by the user equipment, the data in the parallel HARQ manner according to the second carrier indicated by the second carrier parameter.

Figure 13:
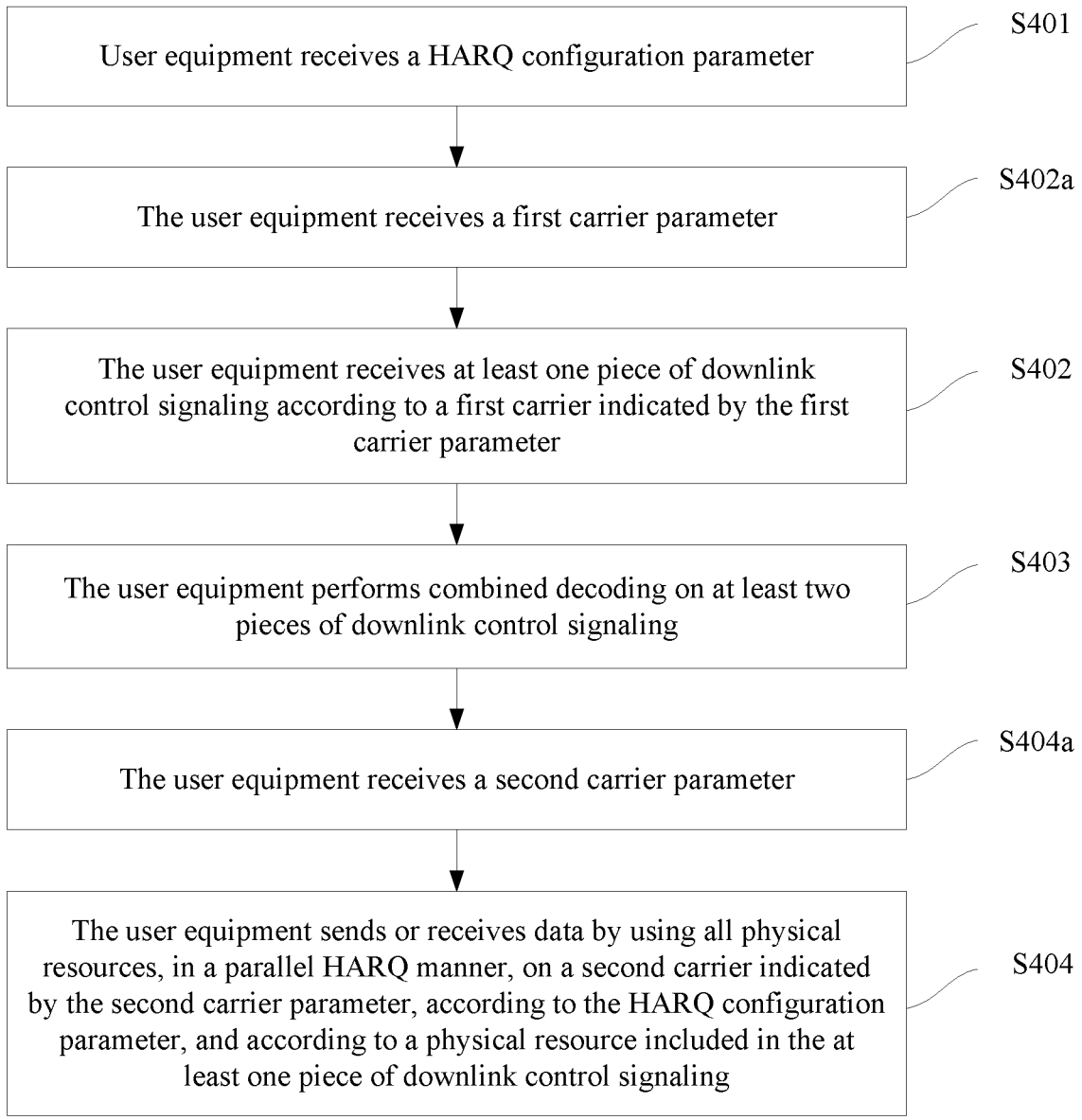
FIG. 13 is a sixth flowchart of a communication method according to an embodiment of the present invention.

For a specific method flowchart including the execution step S404a in this embodiment of the present invention, reference may be made to FIG. 13.

For example, a specific implementation scenario of a method execution process shown in FIG. 13 in this embodiment of the present invention may be the following two scenarios.

Figure 14:
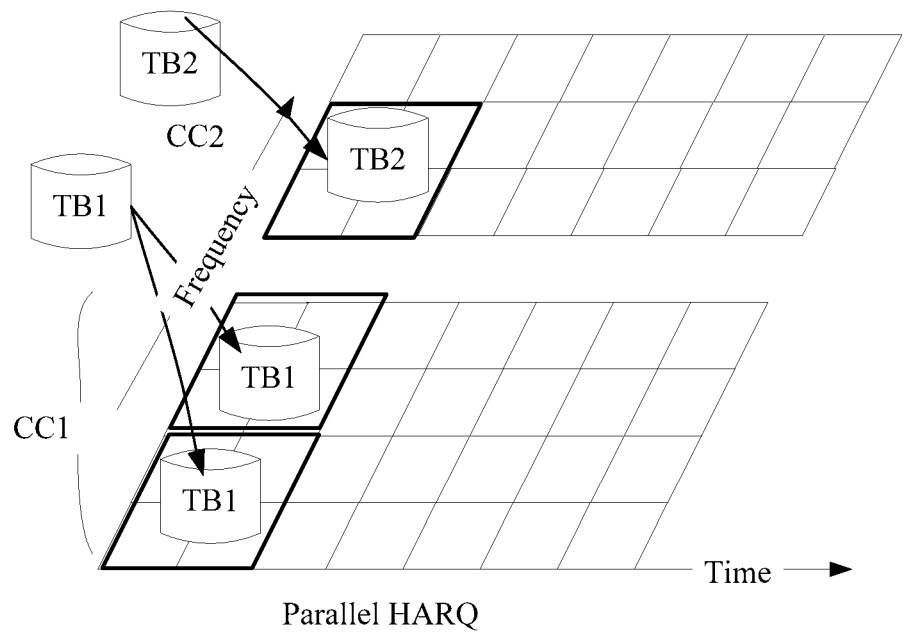
FIG. 14 is a first schematic diagram of a carrier used for sending or receiving in a parallel HARQ manner according to an embodiment of the present invention.

Scenario 1:

As shown in FIG. 14, if the second carrier indicated by the second carrier parameter is a carrier 1, the user equipment sends or receives the data in the parallel HARQ manner on the carrier 1, and does not send or receive data in the parallel HARQ manner on another carrier.

Figure 15:
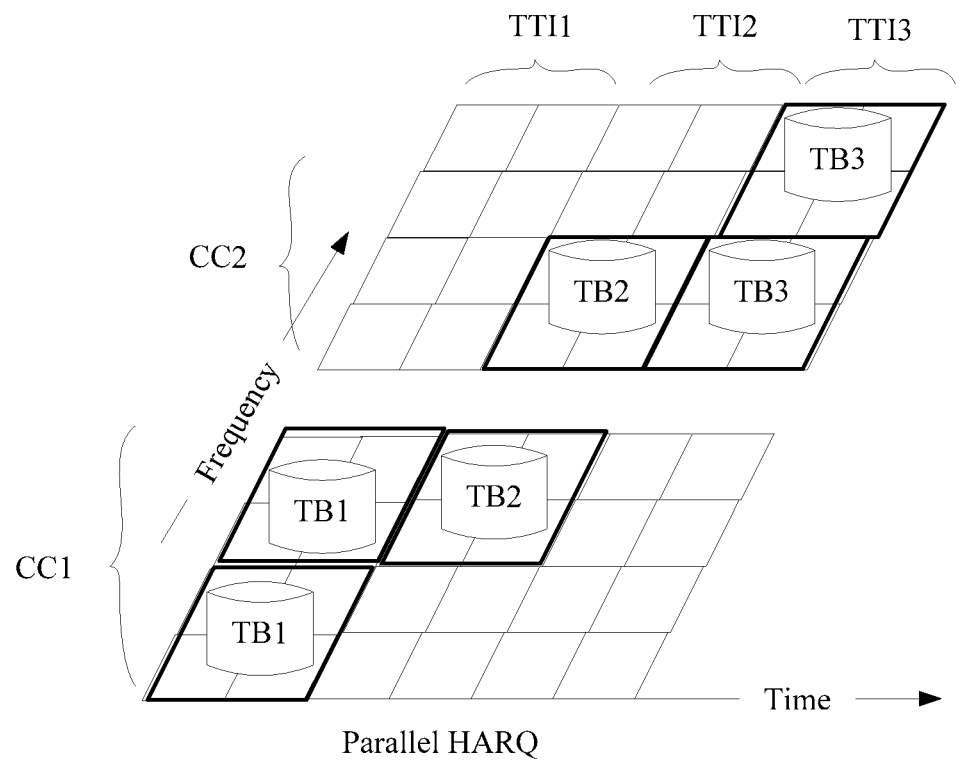
FIG. 15 is a second schematic diagram of a carrier used for sending or receiving in a parallel HARQ manner according to an embodiment of the present invention.

Scenario 2:

As shown in FIG. 15, if the second carrier indicated by the second carrier parameter is a carrier 1 and a carrier 2, the user equipment may send or receive the data in the parallel HARQ manner on the carrier 1, the carrier 2, or the carrier 1 and the carrier 2, and does not send or receive data in the parallel HARQ manner on another carrier.

Optionally, in this embodiment of the present invention, the user equipment may further receive cross-carrier parameter information indicating whether to execute parallel HARQs across carriers. The cross-carrier parameter information is used to indicate whether the user equipment can send or receive data in the parallel HARQ manner on multiple carriers. If the user equipment receives the cross-carrier parameter information instructing the user equipment to execute parallel HARQs across carriers, the user equipment sends or receives data in the parallel HARQ manner on multiple carriers. If the user equipment does not receive the cross-carrier parameter information instructing the user equipment to execute parallel HARQs across carriers, the user equipment sends or receives data in the parallel HARQ manner on one carrier.

In this embodiment of the present invention, when the user equipment is allowed to execute parallel HARQs, the multiple carriers may be licensed spectrum carriers, or may be unlicensed spectrum carriers, or a combination of a licensed spectrum carrier and an unlicensed spectrum carrier. This is not limited in the present invention.

It should be noted that in the method procedure shown in FIG. 12 in this embodiment of the present invention, a function of the first carrier parameter that is used to indicate the first carrier used for receiving the downlink control signaling is similar to that of the second carrier parameter, and details are not described herein again.

In this embodiment of the present invention, the second carrier parameter may indicate one or more second carriers. Further, when there is more than one second carrier, that is, at least two carriers are included, the following step may further be included.

S404*b*. Receive instruction information for configuring at least two subcarriers included in the second carrier as one virtual carrier.

In this case, the user equipment may send or receive the data in the parallel HARQ manner according to the second carrier indicated by the second carrier parameter specifically in the following way:

configuring the at least two subcarriers included in the second carrier as one virtual carrier according to the instruction information for configuring the at least two subcarriers included in the second carrier as one virtual carrier; and sending or receiving the data in the parallel HARQ manner on the virtual carrier.

Figure 16:
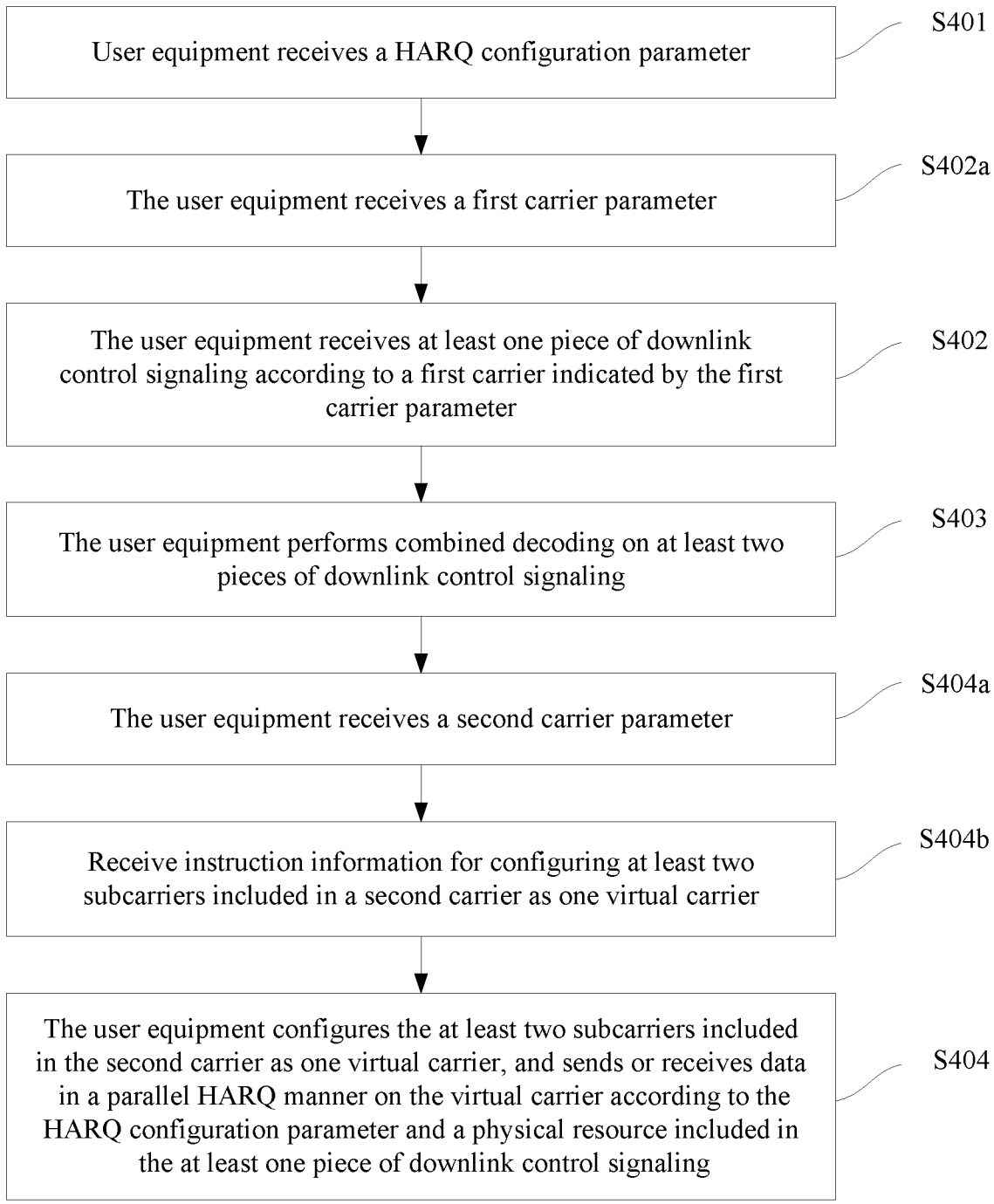
FIG. 16 is a seventh flowchart of a communication method according to an embodiment of the present invention.

For a specific method flowchart including the execution step S404*b* in this embodiment of the present invention, reference may be made to FIG. 16.

Figure 17:
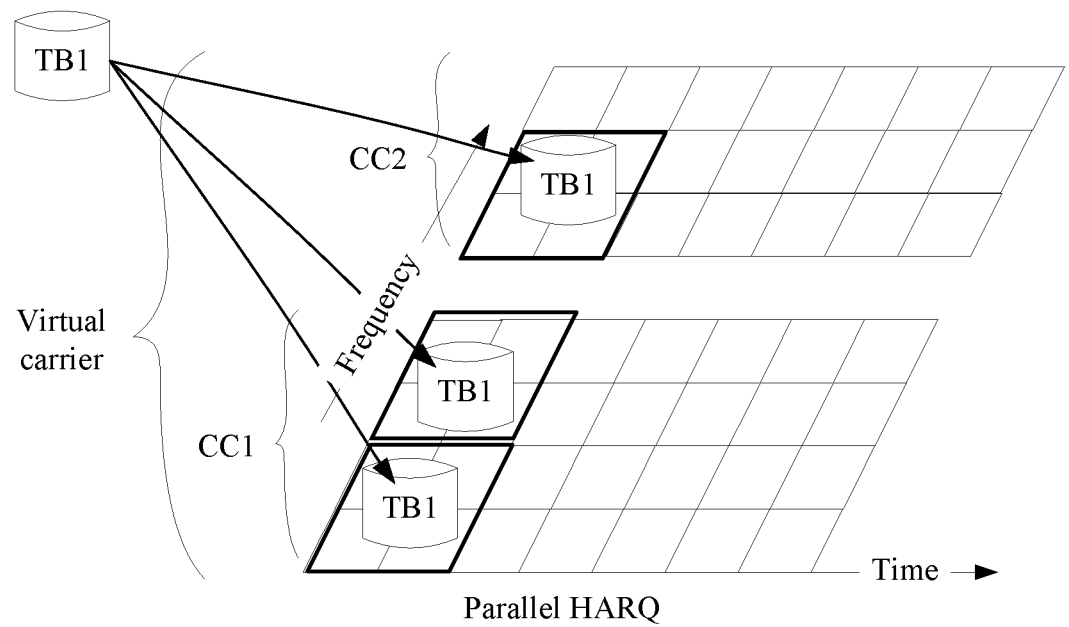
FIG. 17 is a schematic diagram of a virtual carrier used for sending or receiving in a parallel HARQ manner according to an embodiment of the present invention.

For example, a specific implementation scenario of a method execution process shown in FIG. 16 in this embodiment of the present invention may be as follows:

As shown in FIG. 17, if the user equipment receives instruction information for configuring a carrier 1 and a carrier 2 as one virtual carrier, the user equipment configures the carrier 1 and the carrier 2 as one virtual carrier, and sends or receives data in the parallel HARQ manner on the virtual carrier.

In this embodiment of the present invention, the foregoing first carrier parameter, the second carrier parameter, the cross-carrier instruction information, and the instruction information for configuring a virtual carrier may be configured in the HARQ configuration parameter, or may be configured in the downlink control signaling. This is not limited in this embodiment of the present invention.

Optionally, in this embodiment of the present invention, before the user equipment receives the parallel HARQ communication instruction, the method further includes the following step.

S401*a*. The user equipment sends capability information used to represent that the user equipment supports sending or receiving the data in the parallel HARQ manner.

Figure 18:
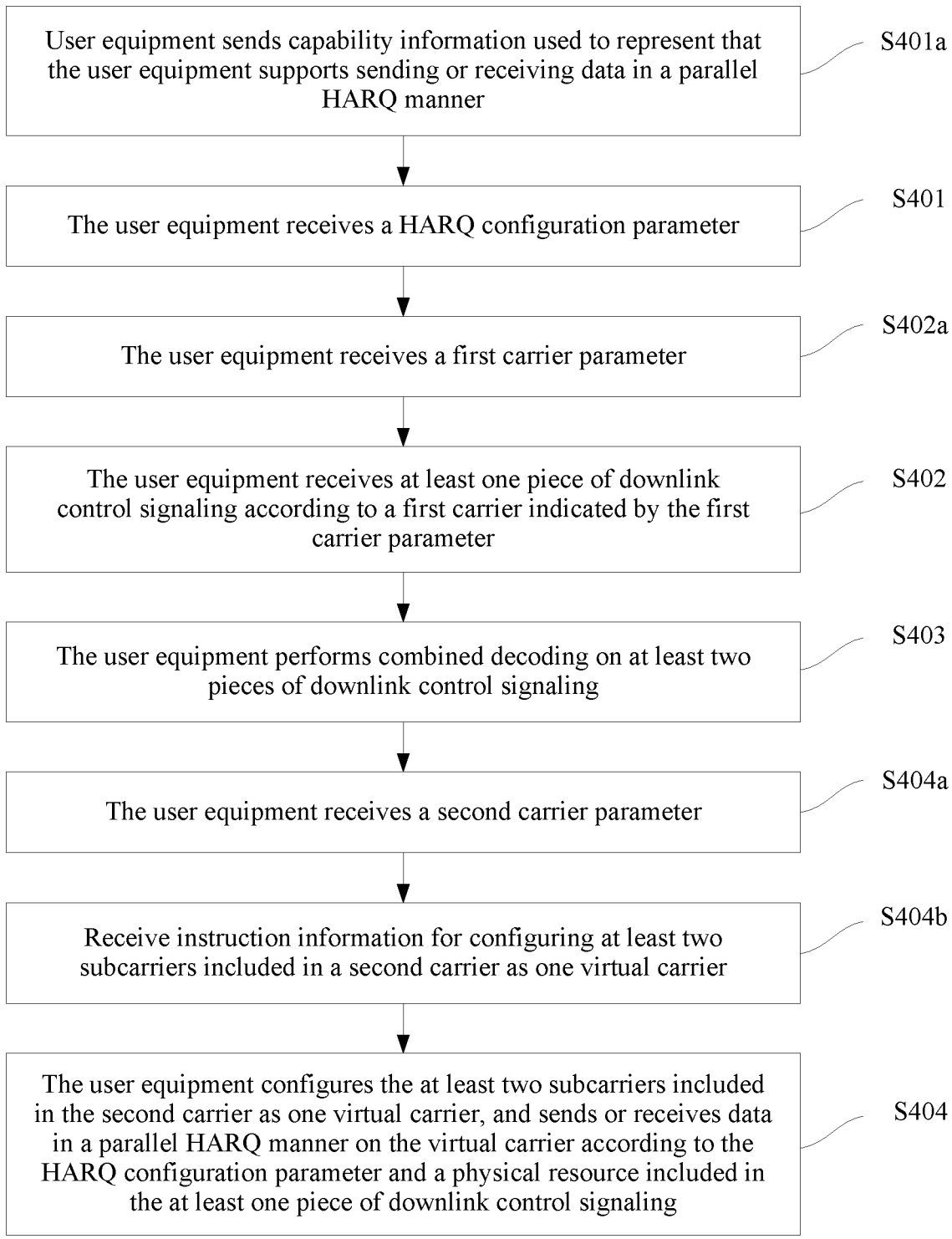
FIG. 18 is an eighth flowchart of a communication method according to an embodiment of the present invention.

For a specific method flowchart including the execution step S401*a* in this embodiment of the present invention, reference may be made to FIG. 18.

In this embodiment of the present invention, the capability information sent by the user equipment and used to represent that the user equipment supports sending or receiving the data in the parallel HARQ manner may be capability information representing whether the user equipment supports sending or receiving the data in the parallel HARQ manner, or may be capability information representing a quantity of parallel HARQs used by the user equipment to support sending or receiving the data in the parallel HARQ manner.

For example, the user equipment may send capability information representing that the user equipment supports sending or receiving data in a manner of M parallel HARQs, and M is a positive integer, for example, M may be 1, 2, 3, 4, and the like, so as to indicate that different user equipment has a different parallel HARQ capability.

In this embodiment of the present invention, when the user equipment sends only the capability information representing whether the user equipment supports sending or receiving the data in the parallel HARQ manner, and does not send a specific quantity of parallel HARQs supported by the user equipment, the specific quantity of parallel HARQs supported by the user equipment may be specified by using a protocol notification or in another manner.

Optionally, in this embodiment of the present invention, the quantity of parallel HARQs by using which the user equipment supports sending or receiving the data in the parallel HARQ manner may be specifically determined in the following manner:

The user equipment determines a supported quantity of carriers for carrier aggregation, and determines the determined quantity of carriers as the quantity of parallel HARQs by using which the user equipment supports sending or receiving the data in the parallel HARQ manner.

In this embodiment of the present invention, applications scenarios in which the user equipment determines, according to a supported carrier aggregation capability, the quantity of parallel HARQs by using which the user equipment supports sending or receiving the data in the parallel HARQ manner may be specifically as follows:

Scenario 1:

If the user equipment supports aggregation of a carrier 1 and a carrier 2, that is, if a quantity that is of carriers for carrier aggregation and that is supported by the user equipment is 2, the quantity of parallel HARQs by using which the user equipment supports sending or receiving the data in the parallel HARQ manner is 2, that is, the user equipment supports sending or receiving the data on the carrier 1, or the carrier 2, or the carrier 1 and the carrier 2, or another carrier other than the carrier 1 and carrier 2 in a parallel HARQ manner with the quantity of HARQs being 2.

Scenario 2:

If the user equipment supports aggregation of a carrier 3, a carrier 4, and a carrier 5, that is, if a quantity that is of carriers for carrier aggregation and that is supported by the user equipment is 3, the quantity of parallel HARQs by using which the user equipment supports sending or receiving the data in the parallel HARQ manner is 3, that is, the user equipment can send or receive the data on the carrier 3, or the carrier 4, or the carrier 5, or the carrier 3, the carrier 4, and the carrier 5, or another carrier other than the carrier 3, carrier 4, and the carrier 5 in a parallel HARQ manner with the quantity of HARQs being 3.

Scenario 3:

If the user equipment supports aggregation of a carrier 1 and a carrier 2 and also supports aggregation of a carrier 3, a carrier 4, and a carrier 5, that is, if a largest quantity that is of carriers for carrier aggregation and that is supported by the user equipment is 3, the quantity of parallel HARQs by using which the user equipment supports sending or receiving the data in the parallel HARQ manner is 3, that is, the user equipment can send or receive the data on any supported carrier or multiple random supported carriers in a parallel HARQ manner with the quantity of HARQs being 3.

Optionally, in this embodiment of the present invention, after the user equipment sends or receives the data in the parallel HARQ manner, the method further includes the following step.

S405. The user equipment sends feedback information by using at least one uplink feedback resource, or receives feedback information by using at least one downlink feedback resource.

For example, the feedback information may include positive acknowledgement information or negative acknowledgement information that is used to indicate whether the user equipment re-sends or re-receives the data.

The at least one uplink feedback resource is a transmission resource determined according to a physical resource used by the at least one piece of downlink control signaling received by the user equipment. The at least one downlink feedback resource is a transmission resource determined according to the physical resource used by the user equipment to send or receive the data in the parallel HARQ manner. For example, an uplink feedback resource may be determined by using each of multiple pieces of downlink control signaling, that is, there are multiple uplink feedback resources. Specifically, when there are multiple pieces of downlink control signaling, an uplink feedback resource is obtained by means of mapping according to a location of a physical resource, such as a CCE (control channel element), occupied by each piece of downlink control signaling, and then uplink feedback is performed according to the multiple feedback resources. Alternatively, a downlink feedback resource is determined by using each transmission resource transmitted by multiple uplink HARQs, that is, there are multiple downlink feedback resources. Specifically, a downlink feedback resource is obtained by means of mapping according to a location of each uplink HARQ transmission resource such as a PRB (physical resource block), and then downlink feedback is performed according to the multiple feedback resources.

Figure 19:
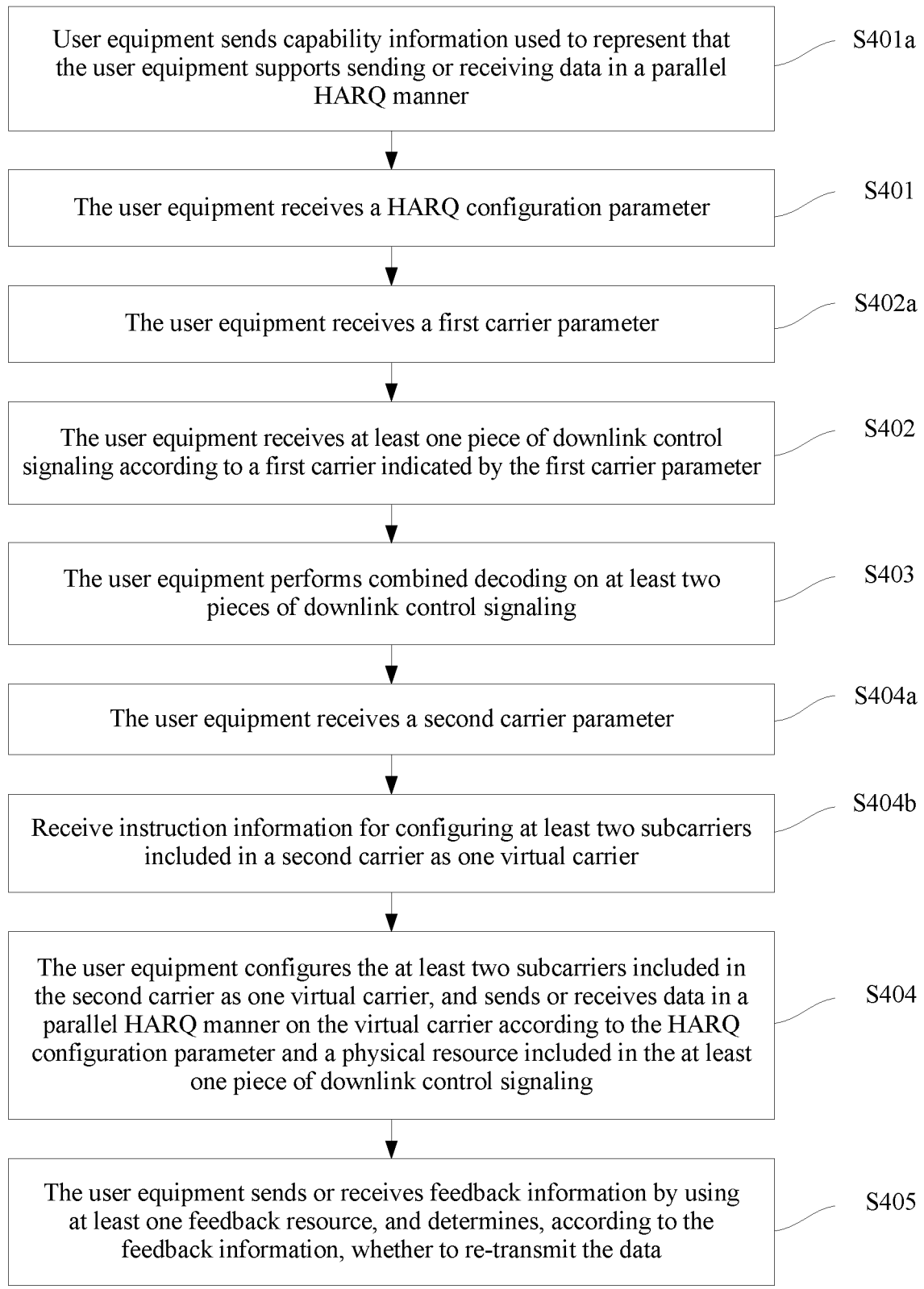
FIG. 19 is a ninth flowchart of a communication method according to an embodiment of the present invention.

For a specific method flowchart including the execution step S405 in this embodiment of the present invention, reference may be made to FIG. 19.

Specifically, in this embodiment of the present invention, when the user equipment sends uplink data in the parallel HARQ manner, the user equipment may receive, by using at least one feedback resource, feedback information sent by a network device such as an eNB, to determine whether data needs to be retransmitted. When the feedback information received by the user equipment is that the network device such as an eNB successfully receives the uplink data, data does not need to be re-sent. When the feedback information received by the user equipment is that the network device such as an eNB fails to receive the uplink data, the user equipment re-sends the data in the parallel HARQ manner.

Specifically, in this embodiment of the present invention, when the user equipment receives downlink data in the parallel HARQ manner, the user equipment may send feedback information to a network device such as an eNB by using at least one feedback resource. When the user equipment successfully receives the downlink data, the user equipment submits the data to a higher layer, sends a positive acknowledgement message to the network device such as an eNB, and does not need to re-receive the data. When failing to receive the data, the user equipment sends a negative acknowledgement message to the network device such as an eNB, and needs to re-receive the data.

Optionally, in this embodiment of the present invention, the feedback information may be sent or received by using at least two feedback resources, so as to improve feedback reliability.

It should be noted that in this embodiment of the present invention, a specific quantity of feedback resources used to send the feedback information may be indicated in a protocol notification manner, or may be indicated in a HARQ configuration parameter manner, and this is not limited in this embodiment of the present invention.

In still another embodiment of the present invention, a communication method in which data is sent or received in a parallel HARQ manner is executed by a network device, that is, a communication device in this embodiment of the present invention is a network device.

When the communication device is a network device, an implementation process of the communication method in which data is sent or received in the parallel HARQ manner provided in this embodiment of the present invention is similar to the foregoing implementation process in which an execution body is user equipment. Differences lie in that the network device does not receive downlink control signaling, and does not send or receive data in the parallel HARQ manner based on information included in the downlink control signaling. Therefore, for the implementation process of the communication method in which the communication device is a network device, details are not described herein, and reference may be made to the implementation method in which the execution body is user equipment.

Figure 20:
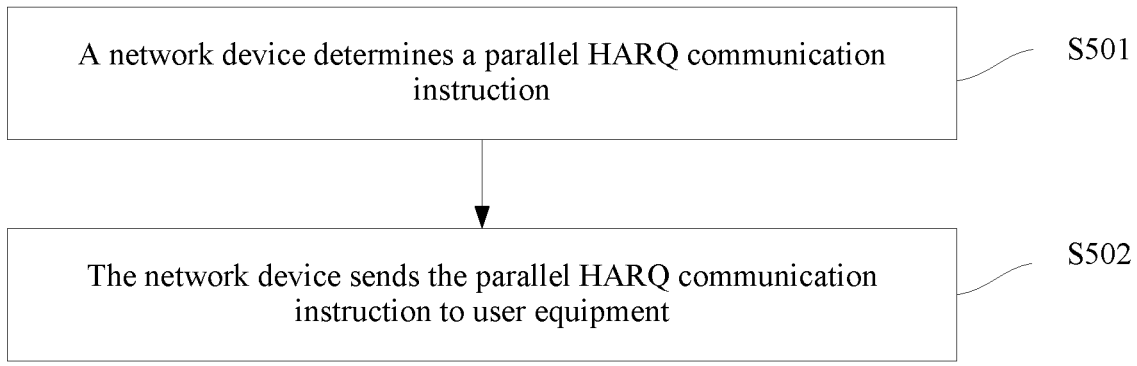
FIG. 20 is a first flowchart of another communication method according to an embodiment of the present invention.

FIG. 20 shows an implementation flowchart of still another communication method according to an embodiment of the present invention. The method shown in FIG. 20 is executed by a network device. As shown in FIG. 20, the method includes the following steps.

S501. The network device determines a parallel HARQ communication instruction.

In this embodiment of the present invention, the parallel HARQ communication instruction is used to instruct user equipment to send or receive data in a parallel HARQ manner. The sending data in a parallel HARQ manner is sending at least one data packet with same content within a same transmission time interval; and the receiving data in a parallel HARQ manner is receiving at least one data packet with same content within a same transmission time interval, and performing combined decoding on the received at least one data packet with same content.

The network device in this embodiment of the present invention may be an evolved NodeB (eNB) in an LTE system, or may be a NodeB in a Universal Mobile Telecommunications System (UMTS), or may be another network device that communicates with the user equipment and configures and schedules a resource for the user equipment. This is not limited in this embodiment of the present invention.

S502. The network device sends the parallel HARQ communication instruction to user equipment.

In this embodiment of the present invention, the network device may send the parallel HARQ communication instruction by using a radio resource control (RRC) message such as a system message, or a dedicated RRC message such as an RRC connection reconfiguration message. Certainly, this is not limited in this embodiment of the present invention. For example, the parallel HARQ communication instruction may further be received by using a physical layer message or a Media Access Control (MAC) layer message.

In this embodiment of the present invention, the network device sends the parallel HARQ communication instruction to the user equipment, so that the user equipment may send or receive data in the parallel HARQ manner according to the parallel HARQ communication instruction. The at least one data packet with same content is sent or received within the same transmission time interval, so that the data packet is sent or received in parallel, and a delay can be reduced. In addition, multiple data packets are sent or received within a same transmission time, so that reliability of data transmission is also improved.

Optionally, in this embodiment of the present invention, the parallel HARQ communication instruction determined by the network device may be a HARQ configuration parameter. The HARQ configuration parameter is a configuration parameter used by the user equipment to send or receive the data in the parallel HARQ manner.

In this embodiment of the present invention, different configuration parameters may be set, according to an actual situation, to be included in the HARQ configuration parameter used as the parallel HARQ communication instruction. For example, in this embodiment of the present invention, the HARQ configuration parameter may include parameter information such as a parallel HARQ quantity parameter used by the user equipment to send or receive data in the parallel HARQ manner, carrier information used for instructing the user equipment to send or receive data in the parallel HARQ manner, and feedback resource information. This is not limited in this embodiment of the present invention.

In an optional manner in this embodiment of the present invention, the HARQ configuration parameter includes the parallel HARQ quantity parameter, and the parallel HARQ quantity parameter includes a largest quantity or a specific quantity of parallel HARQs executed each time the user equipment sends or receives the data.

In this embodiment of the present invention, when the parallel HARQ quantity parameter includes the largest quantity of parallel HARQs, a current specific quantity of parallel HARQs executed when the data is sent or received may be notified in another signaling notification manner, such as a downlink control signaling notification manner, so that physical channel resource overheads are reduced, and a different quantity of parallel HARQs may be used each time the user equipment sends or receives the data, to dynamically adapt to a channel condition change, and ensure low-delay and highly-reliable data sending or receiving.

It should be noted that in this embodiment of the present invention, the HARQ configuration parameter may include an uplink HARQ configuration parameter and a downlink HARQ configuration parameter. The uplink HARQ configuration parameter is used to indicate a configuration parameter required by the user equipment for sending the data in the parallel HARQ manner, and the downlink HARQ configuration parameter is used to indicate a configuration parameter required by the user equipment for receiving the data in the parallel HARQ manner. Certainly, this embodiment of the present invention is not limited to the foregoing manners.

In this embodiment of the present invention, the HARQ configuration parameter is used as the parallel HARQ communication instruction, so that the user equipment sends or receives data in the parallel HARQ manner according to the received HARQ configuration parameter. In this way, data is sent or received in the parallel HARQ manner by using fewer singling overheads, a delay is reduced, and reliability is improved.

Optionally, in this embodiment of the present invention, the network device may configure at least one piece of downlink control signaling. The at least one piece of downlink control signaling includes information such as a physical resource, a modulation and coding scheme, and a parallel HARQ quantity parameter that are used by the user equipment to send or receive the data in the parallel HARQ manner.

Figure 21:
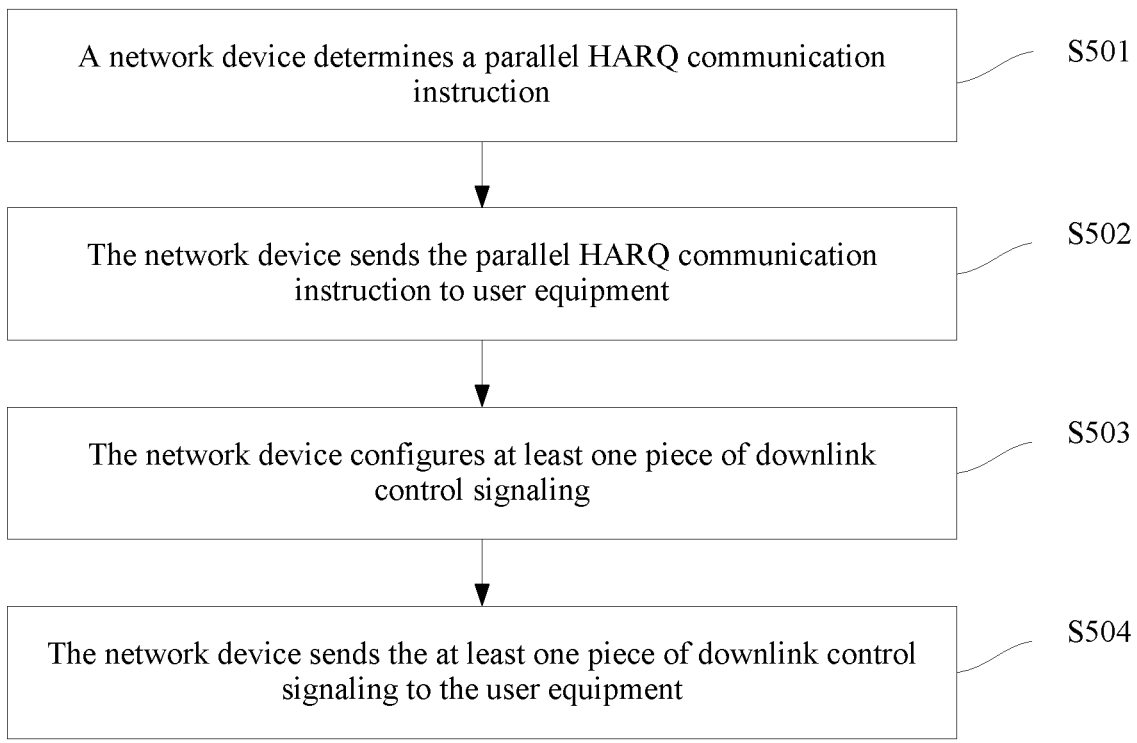
FIG. 21 is a second flowchart of another communication method according to an embodiment of the present invention.

In this embodiment of the present invention, based on the method procedure shown in FIG. 20, at least one piece of configured downlink control signaling may further be sent to the user equipment. The downlink control signaling is used to notify the information such as the physical resource, the modulation and coding scheme, and the parallel HARQ quantity parameter that are used by the user equipment to send or receive the data in the parallel HARQ manner. As shown in FIG. 21, the method further includes the following steps.

S503. The network device configures at least one piece of downlink control signaling.

The at least one piece of downlink control signaling includes the information such as the physical resource, the modulation and coding scheme, and the parallel HARQ quantity parameter that are used by the user equipment to send or receive the data in the parallel HARQ manner. In this embodiment of the present invention, specific information included in the downlink control signaling may be accordingly changed with reference to content included in the configuration parameter. The information included in the HARQ configuration parameter does not need to be notified again in a downlink control signaling manner. For example, the parallel HARQ quantity parameter included in the downlink control signaling may be a largest quantity or a specific quantity of parallel HARQs executed each time the user equipment sends or receives the data, and if the HARQ configuration parameter already includes the specific quantity of parallel HARQs executed each time the user equipment sends or receives the data, the specific quantity of parallel HARQs may not need to be included in the downlink control signaling again.

Optionally, each of the at least one piece of downlink control signaling includes at least one of all physical resources used by the user equipment to send or receive the data in the parallel HARQ manner.

Specifically, all physical resources are a collection of physical resources used for sending or receiving all HARQs when the data is sent or received in the parallel HARQ manner.

Specifically, if there is one piece of downlink control signaling, the downlink control signaling may include all physical resources used by the user equipment, or may include a part of physical resources in all physical resources used by the user equipment. When the downlink control signaling includes a part of physical resources in all physical resources, another physical resource used by the user equipment may be obtained by using the physical resource included in the downlink control signaling and a predetermined rule.

Specifically, if there are at least two pieces of downlink control signaling, the at least two pieces of downlink control signaling may include all physical resources used by the user equipment, or may include a part of physical resources used by the user equipment. Likewise, when the downlink control signaling includes a part of physical resources in all physical resources, another physical resource used by the user equipment may be obtained by using the physical resource included in the downlink control signaling and the predetermined rule.

Optionally, there are at least two pieces of downlink control signaling, and all the pieces of downlink control signaling include a same physical resource. When there are at least two pieces of downlink control signaling, and all the pieces of downlink control signaling include a same physical resource, the physical resources used by the user equipment to send or receive the data in the parallel HARQ manner may be obtained, provided that the user equipment can successfully decode one piece of downlink control signaling. Therefore, reliability can be improved.

S504. The network device sends the at least one piece of downlink control signaling to the user equipment.

In this embodiment of the present invention, the network device may send the downlink control signaling by using a radio resource control (RRC) message such as a system message, or a dedicated RRC message such as an RRC connection reconfiguration message. This is not limited in this embodiment of the present invention.

It should be noted that in this embodiment of the present invention, an execution sequence of all method steps is not limited in a specific implementation process, and FIG. 21 is only an example for description.

Optionally, the network device may further configure downlink control signaling and a carrier parameter used by the user equipment to send or receive the data in the parallel HARQ manner, so as to instruct, by using the corresponding carrier parameter, the user equipment to receive the at least one piece of downlink control signaling and a carrier used for sending or receiving the data in the parallel HARQ manner.

Figure 22:
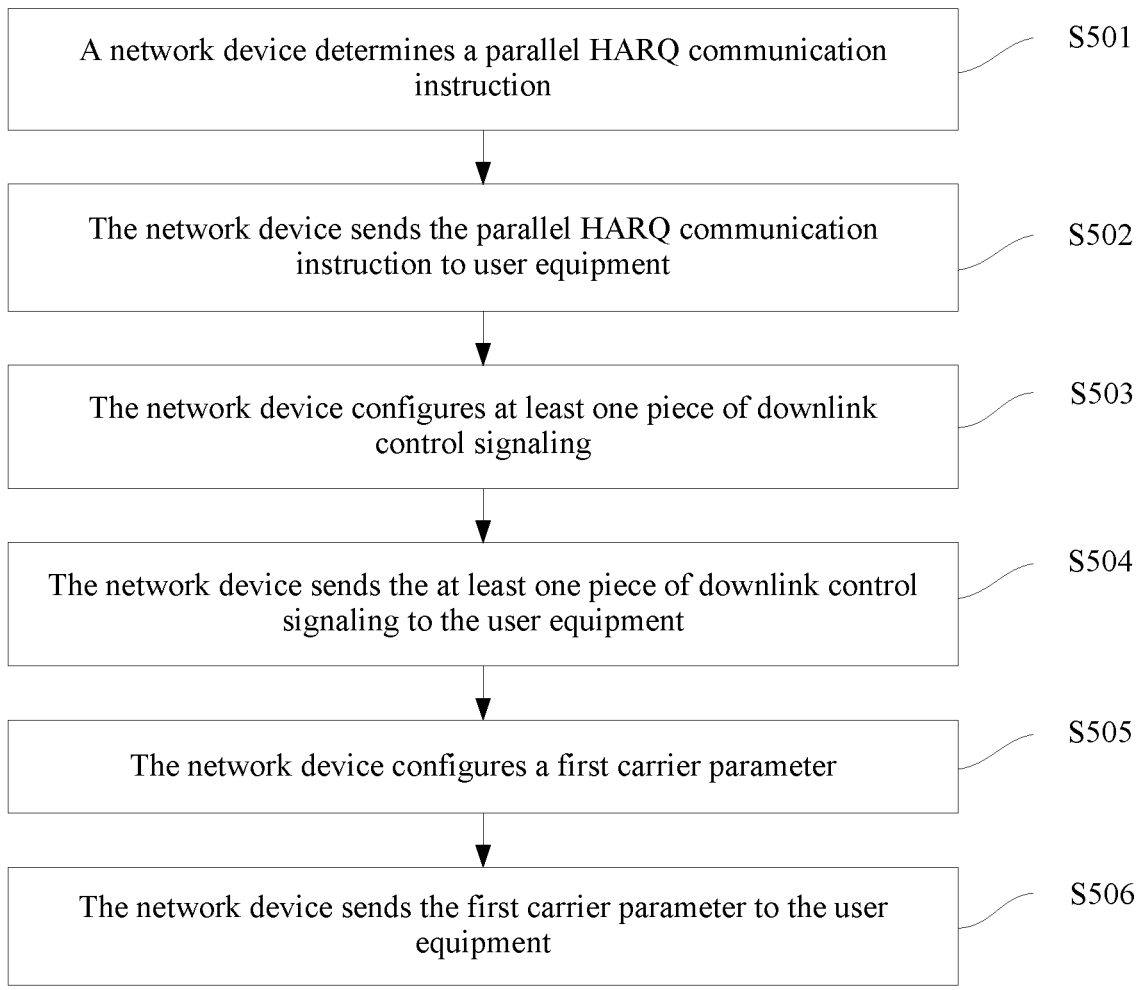
FIG. 22 is a third flowchart of another communication method according to an embodiment of the present invention.

As shown in FIG. 22, in this embodiment of the present invention, an implementation process for configuring the carrier parameter of the downlink control signaling may include the following steps based on the method shown in FIG. 21.

S505. The network device configures a first carrier parameter.

The first carrier parameter is used to indicate a first carrier used by the user equipment to receive the at least one piece of downlink control signaling.

S506. The network device sends the first carrier parameter to the user equipment.

Figure 23:
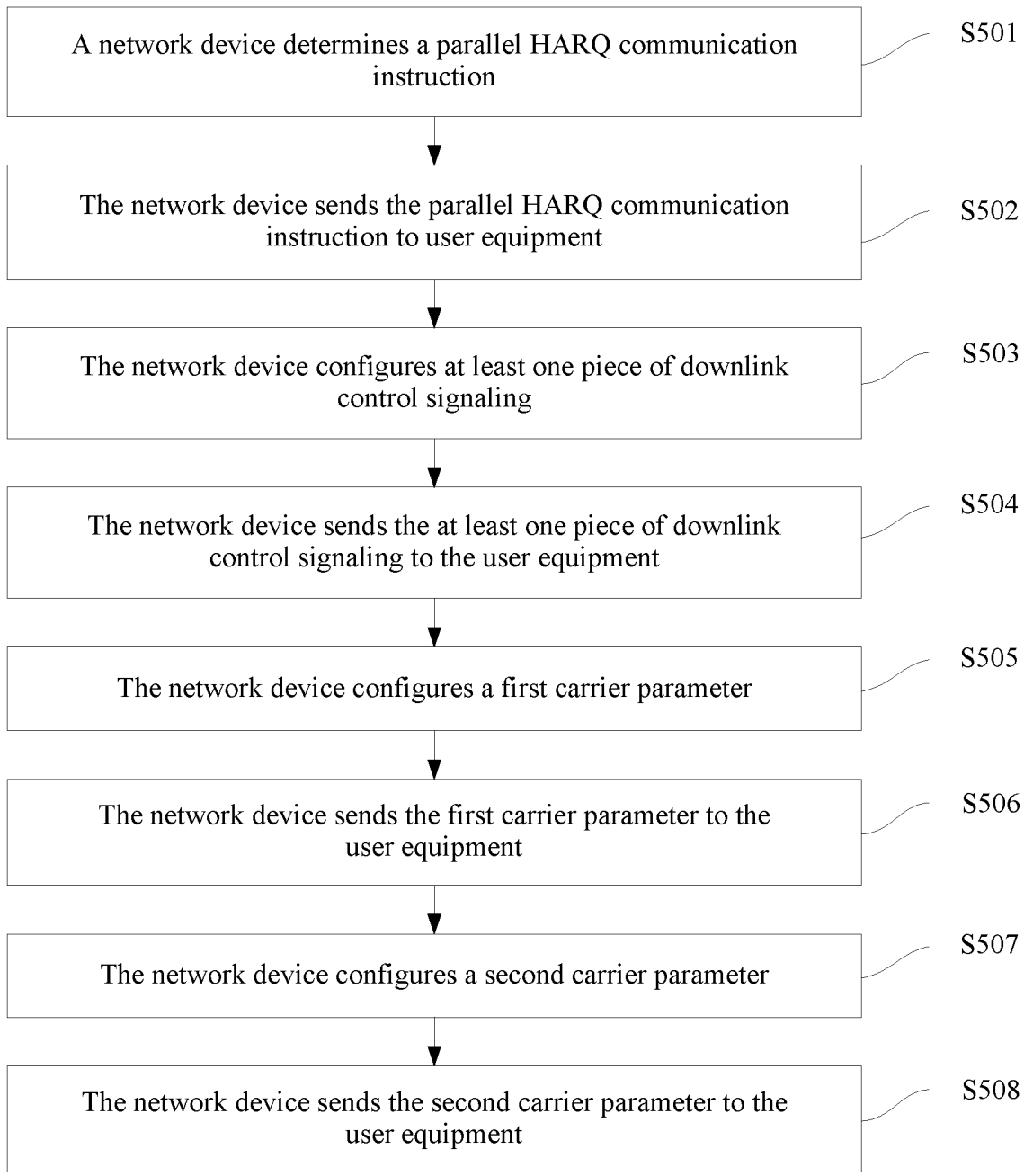
FIG. 23 is a fourth flowchart of another communication method according to an embodiment of the present invention.

In this embodiment of the present invention, an implementation process of the carrier parameter used by the user equipment to send or receive the data in the parallel HARQ manner may include the following steps based on any implementation shown in FIG. 20 to FIG. 22. FIG. 22 is used as an example for description in this embodiment of the present invention. As shown in FIG. 23, the following steps are included.

S507. The network device configures a second carrier parameter, where the second carrier parameter is used to indicate a second carrier used by the user equipment to send or receive the data in the parallel HARQ manner.

S508. The network device sends the second carrier parameter to the user equipment.

Optionally, when the second carrier indicated by the second carrier parameter includes at least two subcarriers, the method further includes:

S509. The network device sends instruction information to the user equipment.

The instruction information is used to instruct the user equipment to configure the at least two subcarriers included in the second carrier as one virtual carrier.

Figure 24:
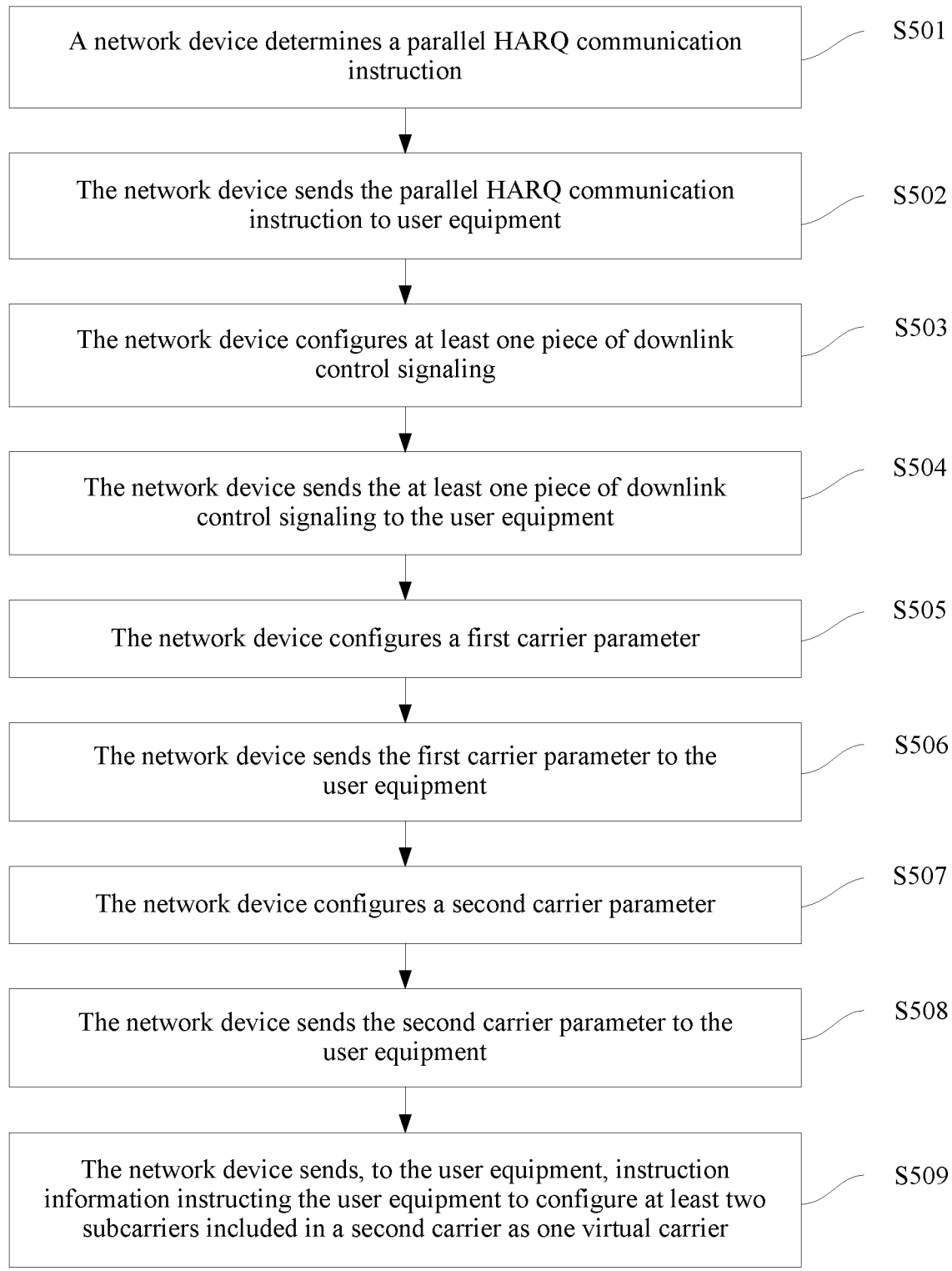
FIG. 24 is a fifth flowchart of another communication method according to an embodiment of the present invention.

For a specific method flowchart including the foregoing execution step S509 in this embodiment of the present invention, reference may be made to FIG. 24.

In this embodiment of the present invention, the network device sends, to the user equipment, the instruction information for configuring the at least two subcarriers included in the second carrier as one virtual carrier, so that the user equipment configures the at least two subcarriers included in the second carrier as one virtual carrier, and sends or receives the data in the parallel HARQ manner on the virtual carrier, thereby using multiple carriers used by the user equipment as one carrier.

Figure 25:
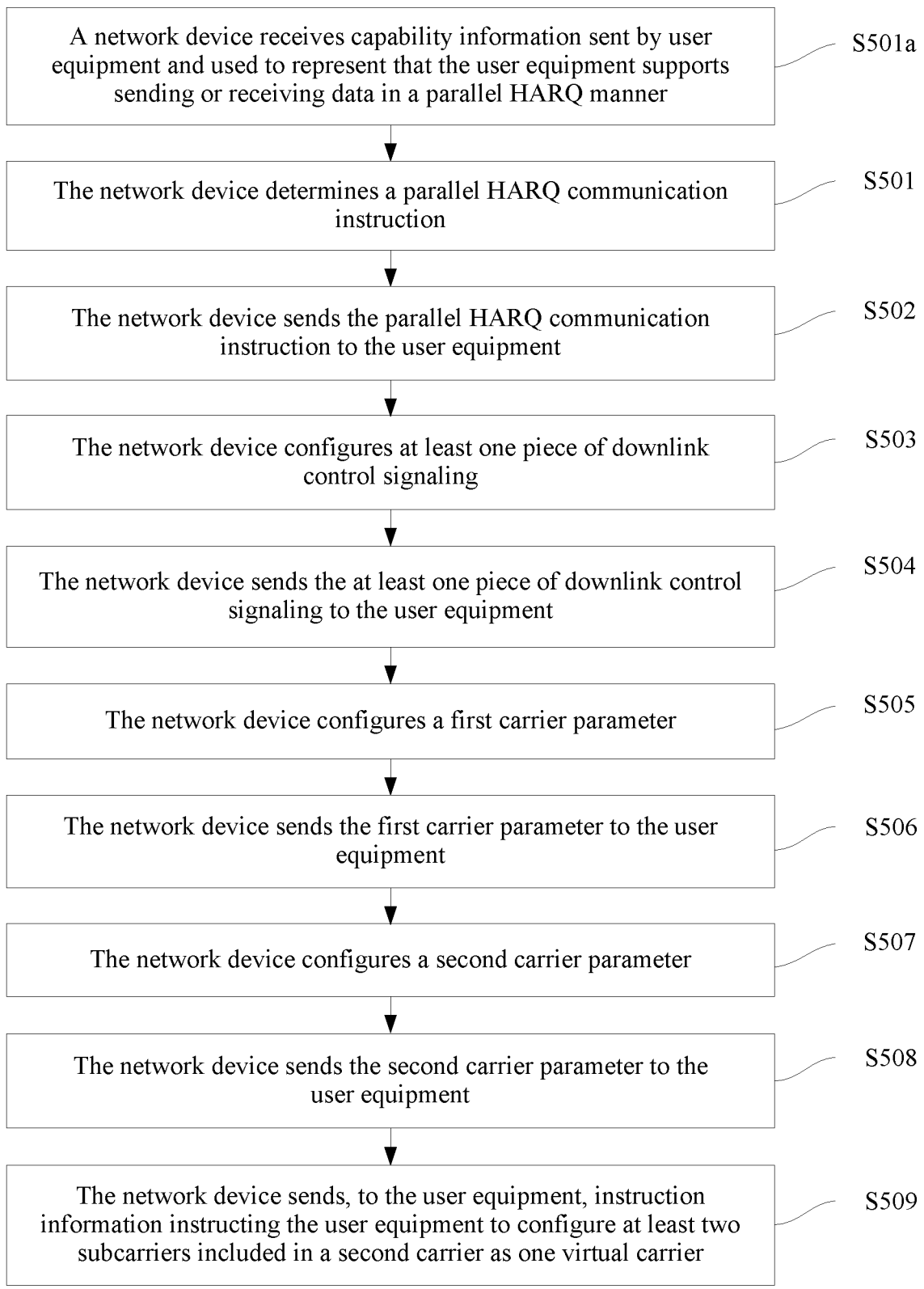
FIG. 25 is a sixth flowchart of another communication method according to an embodiment of the present invention.

Optionally, in this embodiment of the present invention, before the parallel HARQ communication instruction is determined and sent, a step of receiving capability information sent by the user equipment and used to represent that the user equipment supports sending or receiving the data in the parallel HARQ manner may further be included based on any implementation shown in FIG. 20 to FIG. 24. FIG. 22 is used as an example for description in this embodiment of the present invention. As shown in FIG. 25, the method includes the following step:

S510. The network device receives capability information sent by the user equipment and used to represent that the user equipment supports sending or receiving the data in the parallel HARQ manner.

In this embodiment of the present invention, the network device receives the capability information sent by the user equipment and used to represent that the user equipment supports sending or receiving the data in the parallel HARQ manner, so as to set a corresponding parameter according to an actual situation. For example, the network device may accurately configure, in the HARQ configuration parameter, a quantity of parallel HARQs by using which the user equipment supports sending or receiving the data in the parallel HARQ manner.

Optionally, in this embodiment of the present invention, the network device may receive, by using at least one uplink feedback resource, feedback information sent by the user equipment, or may send feedback information to the user equipment by using at least one downlink feedback resource. The at least one uplink feedback resource is a transmission resource determined according to a physical resource used by the downlink control signaling; and the at least one downlink feedback resource is a transmission resource determined according to the physical resource used for sending data in the parallel HARQ manner.

Optionally, in this embodiment of the present invention, the network device may send or receive the feedback information by using at least two feedback resources, so as to improve feedback reliability.

It should be noted that, for description that is about executing the corresponding communication method by the network device and that is not detailed in this embodiment of the present invention, reference may be made to the execution process in which the network device executes the communication method. Details are not described herein again.

Persons of ordinary skill in the art may understand that all or a part of the steps in each of the foregoing method of the embodiments may be implemented by a program instructing a processor. The foregoing program may be stored in a computer readable storage medium. The storage medium may be a non-transitory medium, such as a random-access memory, read-only memory, a flash memory, a hard disk, a solid state drive, a magnetic tape, a floppy disk, an optical disc, or any combination thereof.

The present invention is described with reference to the flowcharts and block diagrams of the method and the device in the embodiments of the present invention. It should be understood that computer program instructions may be used to implement each process and each block in the flowcharts and the block diagrams and a combination of a process and a block in the flowcharts and the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts or in one or more blocks in the block diagrams.

The foregoing descriptions are merely example implementations of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims. Additionally, statements made herein characterizing the invention refer to an embodiment of the invention and not necessarily all embodiments.

What is claimed is:

1. A communication device, comprising:
a non-transitory memory having processor-executable instructions stored thereon; and
a processor, coupled to the memory, wherein the processor is configured to execute the processor-executable instructions to facilitate:
determining a parallel hybrid automatic repeat request (HARQ) communication instruction for sending data in a parallel HARQ manner, wherein sending the data in the parallel HARQ manner comprises sending at least two data packets with the same content within a single transmission time interval (TTI);
receiving downlink control signaling, wherein the downlink control signaling comprises a physical resource, a modulation and coding scheme and a parallel HARQ quantity parameter to be used by the communication device for sending the data in the parallel HARQ manner, wherein the parallel HARQ quantity parameter indicates a quantity of parallel HARQs to be executed for sending the data; and
sending the data in the parallel HARQ manner according to the parallel HARQ communication instruction and based on the physical resource, the modulation and coding scheme and the parallel HARQ quantity parameter of the downlink control signaling.

2. The communication device according to claim 1, wherein the quantity of parallel HARQs to be executed for sending the data is the same as a quantity of carriers for carrier aggregation supported by the communication device.

3. The communication device according to claim 1, wherein the communication device is a user equipment.

4. The communication device according to claim 3, wherein the downlink control signaling comprises multiple physical resources for sending the data in the parallel HARQ manner; and
wherein sending the data in the parallel HARQ manner is based on all physical resources comprised in the downlink control signaling.

5. The communication device according to claim 3, wherein the processor is further configured to execute the processor-executable instructions to facilitate the following before sending the data in the parallel HARQ manner:
performing combined decoding on the at least two pieces of downlink control signaling comprising a same physical resource.

6. The communication device according to claim 1, wherein the processor is further configured to execute the processor-executable instructions to facilitate the following before sending the data in the parallel HARQ manner:
determining a second carrier parameter indicating a second carrier for sending the data in the parallel HARQ manner; and
wherein sending the data in the parallel HARQ manner is further according to the second carrier.

7. A network device, comprising:
a non-transitory memory having processor-executable instructions stored thereon; and
a processor, coupled to the memory, wherein the processor is configured to execute the processor-executable instructions to facilitate:
determining a parallel hybrid automatic repeat request (HARQ) communication instruction for instructing a user equipment to send data in a parallel HARQ manner, wherein sending the data in the parallel HARQ manner comprises sending at least two data packets with the same content within a single transmission time interval (TTI);
configuring downlink control signaling, wherein the downlink control signaling comprises a physical resource, a modulation and coding scheme and a parallel HARQ quantity parameter to be used by the user equipment for sending the data in the parallel HARQ manner, wherein the parallel HARQ quantity parameter indicates a quantity of parallel HARQs to be executed for sending the data; and
sending the parallel HARQ communication instruction and the downlink control signaling to the user equipment.

8. The network device according to claim 7, wherein the processor is further configured to execute the processor-executable instructions to facilitate:
receiving data in the parallel HARQ manner.

9. The network device according to claim 7, wherein the quantity of parallel HARQs to be executed for sending the data is the same as a quantity of carriers for carrier aggregation supported by the user equipment.

10. The network device according to claim 7, wherein the downlink control signaling comprises multiple physical resources for sending the data in the parallel HARQ manner.

11. The network device according to claim 10, wherein the downlink control signaling comprises at least two pieces of downlink control signaling comprising a same physical resource.

12. A communication method, comprising:
   determining, by a communication device, a parallel hybrid automatic repeat request (HARQ) communication instruction, wherein the parallel HARQ communication instruction is used to instruct the communication device to send data in a parallel HARQ manner, wherein sending the data in the parallel HARQ manner comprises sending at least two data packets with the same content within a single transmission time interval (TTI);
   receiving, by the communication device, downlink control signaling, wherein the downlink control signaling comprises a physical resource, a modulation and coding scheme and a parallel HARQ quantity parameter to be used by the communication device for sending the data in the parallel HARQ manner, wherein the parallel HARQ quantity parameter indicates a quantity of parallel HARQs to be executed for sending the data; and
   sending, by the communication device, the data in the parallel HARQ manner according to the parallel HARQ communication instruction and based on the physical resource, the modulation and coding scheme and the parallel HARQ quantity parameter of the downlink control signaling.

13. The method according to claim 12, wherein the quantity of parallel HARQs to be executed for sending the data is the same as a quantity of carriers for carrier aggregation supported by the communication device.

14. The method according to claim 12, wherein the communication device is a user equipment.

15. The method according to claim 14, wherein the downlink control signaling comprises multiple physical resources for sending the data in the parallel HARQ manner; and
   wherein sending the data in the parallel HARQ manner is based on all physical resources comprised in the downlink control signaling.

16. The method according to claim 14, wherein before sending the data in the parallel HARQ manner, the method further comprises:
   performing, by the communication device, combined decoding on at least two pieces of downlink control signaling comprising a same physical resource.

17. The method according to claim 12, wherein before sending the data in the parallel HARQ manner, the method further comprises:
   determining a second carrier parameter indicating a second carrier for sending the data in the parallel HARQ manner; and
   wherein sending the data in the parallel HARQ manner is further according to the second carrier.

* * * * *